United States Patent [19]
Umeyama et al.

[11] Patent Number: 6,080,199
[45] Date of Patent: Jun. 27, 2000

[54] GEAR DESIGNING METHOD, GEAR MANUFACTURING METHOD, AND GEAR MANUFACTURED BY THE SAME METHOD

[75] Inventors: Mitsuhiro Umeyama, Okazaki; Masana Kato; Katsumi Inoue, both of Sendai, all of Japan

[73] Assignee: Toyota Jidosha Kabushiki Kaisha, Toyota, Japan

[21] Appl. No.: 09/068,998

[22] PCT Filed: Oct. 1, 1997

[86] PCT No.: PCT/JP97/03514

§ 371 Date: May 28, 1998

§ 102(e) Date: May 28, 1998

[87] PCT Pub. No.: WO98/14296

PCT Pub. Date: Apr. 9, 1998

[30] Foreign Application Priority Data

Oct. 2, 1996 [JP] Japan .................................. 8-261811
Oct. 2, 1996 [JP] Japan .................................. 8-261812

[51] Int. Cl.$^7$ .................................................. G06F 17/50
[52] U.S. Cl. .................... 703/1; 703/2; 703/7; 29/893.3; 74/462
[58] Field of Search ................... 395/500.01, 500.23, 395/500.28; 74/462, 461; 29/893, 893.3; 409/48, 74

[56] References Cited

U.S. PATENT DOCUMENTS

| | | | |
|---|---|---|---|
| 4,276,785 | 7/1981 | Rouverol | ............................... 74/462 |
| 5,083,474 | 1/1992 | Rouverol | ............................... 74/461 |
| 5,341,699 | 8/1994 | Rouverol | ............................... 74/462 |
| 5,485,761 | 1/1996 | Rouverol | ............................... 74/462 |

*Primary Examiner*—Kevin J. Teska
*Assistant Examiner*—Douglas W. Sergent
*Attorney, Agent, or Firm*—Oblon, Spivak, McClelland, Maier & Neustadt, P.C.

[57] ABSTRACT

Amplitude of transmission error of tooth pair of a gear is obtained in relation to actual contact ratio ($\epsilon_r$) which is an angular range ($\theta_r$) of actual contact of the surfaces of the tooth pair divided by an angular pitch ($\theta_p$) of the gear. The specifications and/or tooth surface modification of the gear is/are are determined so as to reduce the transmission error amplitude under non-load condition in which the actual contact ratio ($\epsilon_r$) is 1.0. Alternatively, the specifications and/or tooth surface modifications is/are determined so as to increase an effective contact ratio ($\epsilon_n$) which is an angular range ($\theta_n$) divided by the angular pitch ($\theta_p$), the angular range ($\theta_n$) corresponding to a portion of a path of the tooth contact point in which an edge contact of the tooth pair does not take place at the tooth top or at the ends of the face width of the teeth. These arrangements permit efficient and easy designing of a gear having a reduced noise, without simulations or tests.

14 Claims, 30 Drawing Sheets

(a)

(b)

(a)

(b)

(a)

TOOTH PROFILE MODIFICATION (b)

LEAD MODIFICATION (a) LEAD (b) TOOTH PROFILE (a) NUMBER OF TEETH (b) PRESSURE ANGLE (c) TOOTH DEPTH (d) FACE WIDTH (a) GEAR NO. 1

(b) GEAR NO. 2

(a) GEAR NO. 1

(b) GEAR NO. 2

----- CALCULATED VALUE
—— ACTUALLY MEASURED VALUE (a) FIRST-ORDER COMPONENT (b) SECOND-ORDER COMPONENT (a) $\varepsilon_n$ :2.07  (b) $\varepsilon_n$ :2.30  (c) $\varepsilon_n$ :2.65

(a) INFLUENCE OF TOOTH DEPTH h (b) INFLUENCE OF PRESSURE ANGLE $\alpha$ (a) INFLUENCE OF FACE WIDTH b (b) INFLUENCE OF HELIX ANGLE $\beta$ (a) $\varepsilon_n$ : 2.30

(b) $\varepsilon_n$ : 2.43

(c) $\varepsilon_n$ : 2.65

(a) WITHOUT BIAS  (b) BIAS-IN  (c) BIAS-OUT

GEAR DESIGNING METHOD, GEAR MANUFACTURING METHOD, AND GEAR MANUFACTURED BY THE SAME METHOD

BACKGROUND OF THE INVENTION

1. Field of the Invention

The present invention relates to a method of designing a gear, a method of manufacturing the gear, and the gear manufactured by the manufacturing method, and more particularly, to techniques for efficient and easy designing and manufacturing of gears which have a reduced gear noise.

2. Discussion of the Background

A tooth of a gear ideally has an involute profile, but usually has an error due to heat treatment, for example. The gear may have a transmission error due to the error in the tooth profile, causing a gear noise. Further, misalignment of the axis of one of shafts on which meshing gears are mounted may cause partial contact (edge contact) in which the teeth of one of the gears contact at their edges with the tooth surface of the other gear, resulting in a comparatively large amount of transmission error of the gears. The axial misalignment of the gear shaft, which may be caused by a manufacturing or assembling error of a gear box, consists of an error in parallelism of the gear axis due to deviation from the nominal axis, and an error of torsion about the gear axis. The above-indicated transmission error is an error in the angle of rotation of the pair of meshing gears, which may be represented by an amount of advance or retard of the driven gear when the other gear is rotated at a constant velocity.

On the other hand, since the gear noise depends upon a load, the gear specifications and the tooth surface modifications are generally selected so as to reduce the transmission error (gear noise), by conducting simulations taking account of only the gear deflection due to the load, or by conducting tests on prototype gears under various conditions. However, a mechanism in which the load has an influence on the transmission error has not been clarified, and the influence cannot be exactly calculated. Therefore, it has been required to conduct such simulations or prototype tests over the entire range of the load in which the gears are used.

It is also proposed to design a gear, by using a contact ratio thereof which is determined on the assumption that the gear has no errors or tooth surface modification. However, since the amount of transmission error (gear noise) differs depending upon the specific method of the tooth surface modification, for instance, simulations or tests on prototype gears must also be effected under various conditions to determine the gear specifications or tooth surface modifications.

However, such simulations or prototype tests require extremely long time of calculation, large amount of cost for the manufacture of the prototypes and large number of evaluation steps. The probability of obtaining an optimum solution depends upon the number of the simulations or tests conducted, and a limited number of the simulations or tests does not necessarily provide a completely satisfactory gear.

SUMMARY OF THE INVENTION

The present invention was made in view of the background art discussed above. It is an object of the present invention to make it possible to efficiently and easily design a gear having a reduced gear noise.

To achieve such an object, the present invention provides a method of designing a gear, characterized in that at least one of specifications and a tooth surface modification of the gear is determined based on an actual contact ratio of said gear.

That is, it was found for the first time that an influence of the actual contact ratio on the transmission error (gear noise) can be exactly calculated. The gear having a reduced transmission error can be efficiently and easily designed, without performing simulations or tests, by determining the specifications and/or the tooth surface modification of the gear based on the actual contact ratio.

The above-indicated actual contact ratio may be represented by a value $\theta_r/\theta_p$, wherein $\theta_r$ represents an angular range in which a pair of teeth actually contact each other, while $\theta_p$ represents an angular pitch of the gear. It was found for the first time that the transmission error under the non-load condition in which the actual contact ratio $\theta_r/\theta_p$ is equal to 1.0 is the largest. The transmission error can be reduced over the entire load range by minimizing the transmission error under the non-load condition in which the actual contact ratio $\theta_r/\theta_p$ is 1.0.

According to another aspect of the present invention, there is provided a method of designing a gear, characterized in that at least one of specifications and a tooth surface modification of the gear is determined based on an effective contact ratio of said gear.

That is, it was found for the first time that the effective contact ratio influences the transmission error (gear noise) under a load condition. The gear having a reduced transmission error can be efficiently and easily designed, without performing simulations or tests, by determining the specifications and/or the tooth surface modification of the gear based on the effective contact ratio.

Described in detail, since the transmission error under the load condition decreases with an increase in the effective contact ratio, it is desirable to increase the effective contact ratio, by biasing the tooth surface modification in a bias-in direction, for example. The effective contact ratio may be represented by a value $\theta_n/\theta_p$, wherein $\theta_n$ represents an angular range corresponding to a portion of a path of a contact point of the pair of teeth in which the pair of teeth does not have an edge contact on a tooth top thereof or at an end of a face width thereof, while $\theta_p$ represents an angular pitch of the gear. An increase in the transmission error under the load condition can be prevented, and the gear noise can be effectively reduced, by increasing the effective contact ratio to at least about 2.4 or higher, preferably, at least about 2.5 or higher.

Preferably, the effective contact ratio is increased by determining the specifications so as to increase a geometrical contact ratio of said gear, and providing a tooth surface of the gear with a biased modification. Alternatively, at least one of the specifications and the tooth surface modification of the gear is preferably determined so as to reduce an amplitude of a transmission error of the pair of teeth under a non-load condition and to increase the effective contact ratio.

Substantially the same advantages as described above may be provided by a method of manufacturing a gear, wherein at least one of specifications and a tooth surface modification of the gear is determined according to a gear designing method as described above, and gear is manufactured such that the gear has the thus determined specifications and/or tooth surface modification. Also, a gear manufactured according to the present manufacturing method has substantially the same advantages as described above.

DETAILED DESCRIPTION OF THE PREFERRED EMBODIMENTS

The present invention will be described in detail, by reference to the drawings.

<Calculation of Loaded Transmission Error>

A pair of teeth of gears having modified tooth surfaces has a point contact, if elastic deformation of the teeth is ignored. With the center of a contact ellipse being considered to be located at the point of contact of the tooth pair under load, loaded transmission error e of the tooth pair is derived as a sum of bending deflection $\delta_b$, approach deformation $\delta_c$ and amount S of tooth surface modification. The following formula (1) represents the transmission error e of the tooth pair:

$$e = \delta_b(\theta_M, \Phi_M, P_{nj}) + \delta_c(\theta_M, \Phi_M, P_{nj}) + S(\theta_M, \Phi_M) \qquad (1)$$

wherein $\theta_M$ and $\phi_M$ represent coordinates of the contact point, while $P_{nj}$ represents shared loads. The approach deformation $\delta_c$ is calculated using the three-dimensional Hertzian formulas. The bending deflection $\delta_b$ is calculated using an approximating formula which is obtained based on FEM (finite-element method). The performance of the gears is evaluated using an amplitude of a change in the transmission error e during rotation.

[Basic Coordinates]

Figure 1:
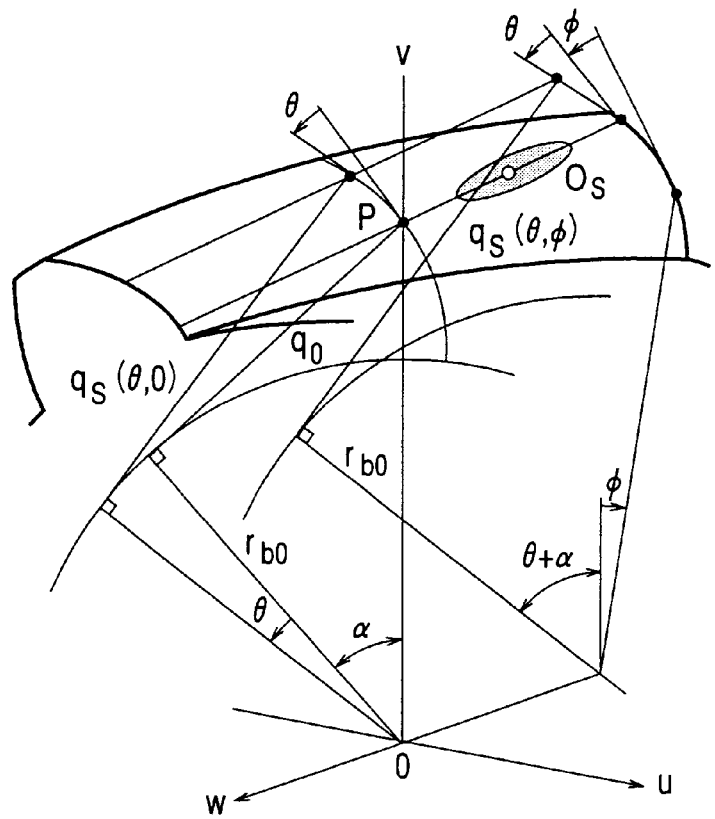
FIGS. 1 are views representing tooth profiles in three-dimensional tangential polar coordinate systems.
Figure 1:
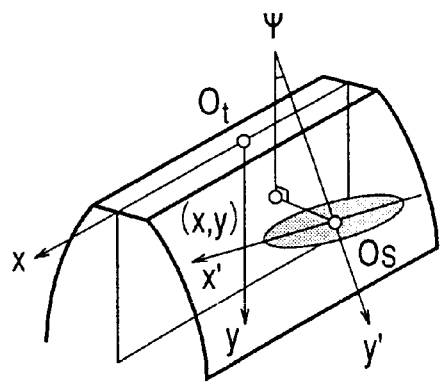

The tooth profile of a helical gear is considered to have a phase difference by rotation at a constant rate for each lead position, and can be expressed in a three-dimensional tangential polar coordinate system in which the lead position is represented by a phase angle $\phi$ and which takes the face width of the tooth into account. The 0-uvw coordinate system wherein the tooth lead is represented by the phase angle $\phi$ is shown in FIG. 1(a). The phase angle $\phi$ is defined according to the following formula (2) which includes a distance w and the tooth lead $L_e$. The distance w is a distance from cross sectional plane at the center of the tooth face width to the tooth surface at each tooth lead position The phase angle $\phi$ represents a phase difference of the tooth profile due to torsion of the tooth, while "$\theta$" is a rotational angle (rolling angle). The bending deflection is calculated in a coordinate system $0_r$-xy of an equivalent spur gear tooth, as shown in FIG. 1(b). Coordinates of contact point $0_s$ are superimposed in the coordinate system $O_r$-xy. "$r_{b°}$" in FIG. 1(a) represents a radius of a base circle of the gear, while "$q_s$" represents a length of a tangent line with the tooth surface modification taken into account.

$$\Phi = 2\pi w/L_e \qquad (2)$$

[Definition of Tooth Surface Modification]

Figure 2:
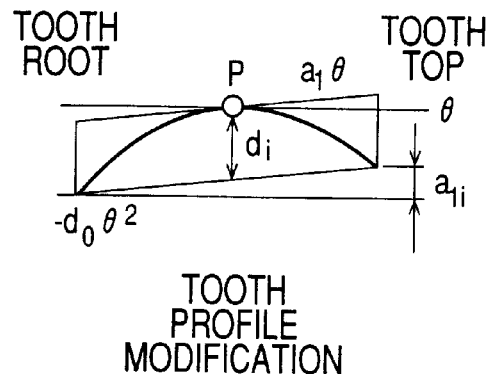
FIGS. 2 are views indicating definitions of tooth profile modification and lead modification.
Figure 2:
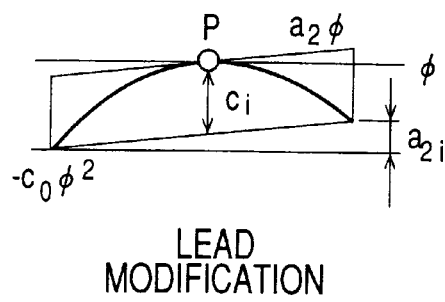

The tooth profile modification and the lead modification are defined as indicated in FIGS. 2. The tooth profile modification is expressed by a sum of parabolic and linear functions respectively representing the convex tooth profile and pressure angle error. The parabolic function represents an amount of modification with the pitch point at the center of the face width being used as a reference point. "$d_0$" and "$a_1$" represent respective coefficients of the convex tooth profile and pressure angle error. Amounts of the modifications are indicated by $d_i$ and $a_{1_i}$. Similarly, "$c_0$" and "$a_2$" represent respective coefficients of crowning and helix angle error in the tooth lead modification. Amounts of the modifications are indicated by $c_i$ and $a_{2i}$. The pressure angle error is positive when the thickness at the tooth top increases, and the helix angle error is positive when the helix angle increases. The tooth profile of only the driven gear is modified by a total amount necessary for the two gears. This arrangement does not lose the accuracy of the analysis.

[Coordinates of Contact Point]

Points on the tooth surface which satisfy the tooth contact conditions at each lead position are obtained, and one of these points which is nearest to the mating tooth surface is selected as the point of contact. The coordinates $(\theta_M, \phi_M)$ of the contact point with the rotational angle $\theta$ are represented by the following formulas (3) and (4) using functions $f(\theta)$ and $g(\theta)$. The point of contact of the tooth pair under load is used as the center of the contact ellipse. "$a_c$" and "$\alpha$" represents a center-to-center distance and the pressure angle, respectively. $A_{TH}$, $A_{F1}$ and $A_{ST}$ are coefficients which represent deviations from the non-modified tooth surface. "$b_0$" is a coefficient of biased modification which provides pressure angle modifications at the opposite ends of the face width in the opposite directions.

$$\begin{cases} \theta_M = f(\theta) \\ \phi_M = g(\theta) \end{cases} \qquad (3)$$

$$\begin{cases} f(\theta) = A_{TH}\theta + A_{F1}g(\theta) + A_{ST} \\ g(\theta) = \dfrac{-(A_{TH}\theta + A_{ST})(b_0 + 2d_0 A_{F1}) + A_{F1}a_1 + a_2}{2(d_0 A_{F1}^2 + b_0 A_{F1} + c_0)} \end{cases} \qquad (4)$$

wherein $$A_{TH} = \left(1 - \frac{2d_0}{a_c \cdot \sin\alpha}\right)$$

$$A_{F1} = \left(1 - \frac{2d_0 + b_0}{a_c \cdot \sin\alpha}\right)$$

$$A_{ST} = \left(\frac{a_1}{a_c \cdot \sin\alpha}\right)$$

[Shared Loads of Meshing Teeth]

Figure 3:
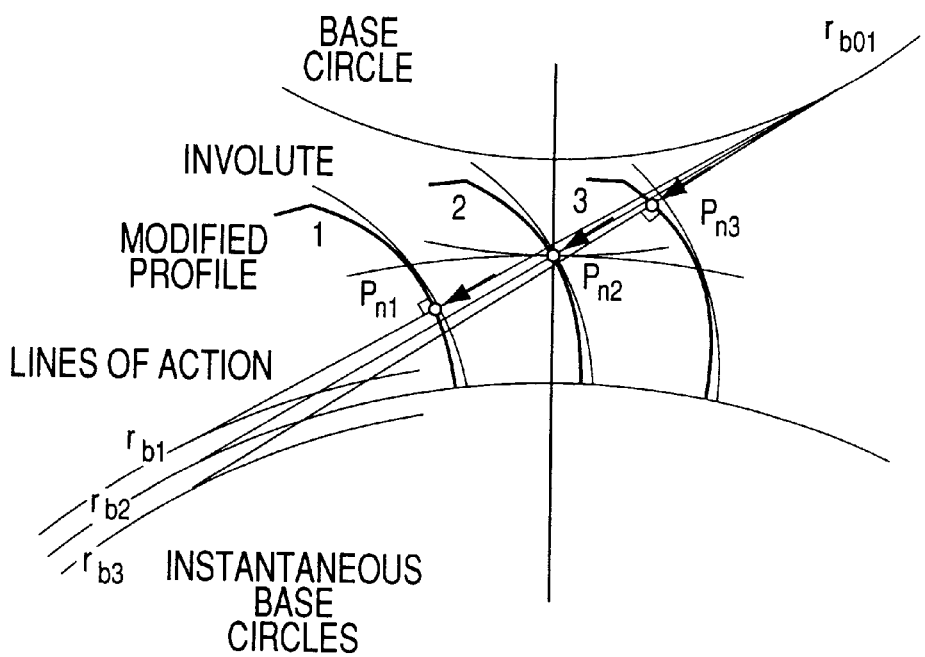
FIG. 3 is a view for explaining shared loads acting on a plurality of meshing teeth.

A formula for calculating the shared loads is obtained based on a relationship between the amount of tooth surface modifications and an amount of deformation of pairs of simultaneously meshing teeth. In an example of FIG. 3, the teeth of three pairs mesh with each other with a given rotation angle. Shared load values $P_{nj}$ act on respective lines of actions of the respective tooth pairs, and the directions in which the load values $P_{nj}$ act vary depending upon the amounts of the tooth surface modifications. The following formula (5) represents an equilibrium of torque values, which in turn represents a relationship between the shared load values and the transmitted load where the number of pairs of the simultaneously meshing teeth is equal to "m". "$r_{bSj}$" represents instantaneous base circles, which are obtained according to the following formula (6) including the tangent line length $q_s$ of FIG. 1(a) which is determined with the tooth surface modification amount taken into account.

$$P_{nj}r_{bSi} + P_{n2}r_{bs2} + \ldots + P_{nm}r_{bSm} = P_n\,r_{b0} \qquad (5)$$

$$r_{bS} = d\,q_s/d\theta \qquad (6)$$

Figure 4:
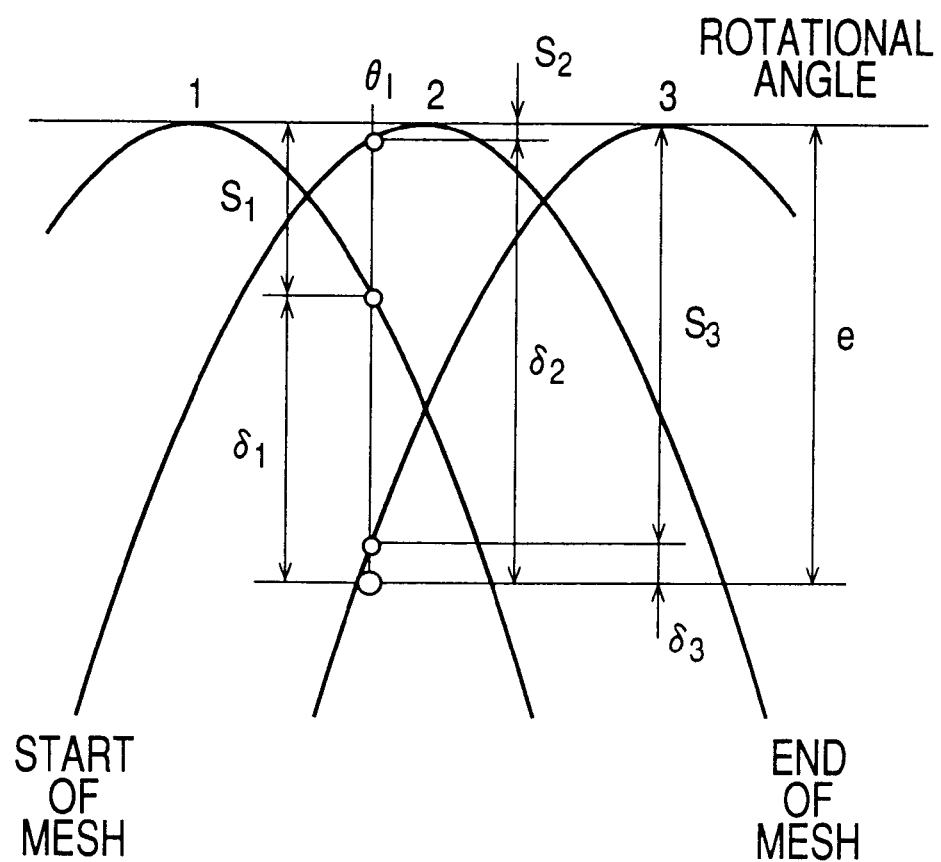
FIG. 4 is a view for explaining a relationship between an amount of deflection δ, an amount S of tooth surface modification and an amount e of transmission error, of each of three pairs of meshing teeth with a rotational angle $\theta_1$.

In the case of three pairs of meshing teeth with the rotational angle $\theta_1$, there exists a relationship as shown in FIG. 4 among the deformation amount $\delta$ at the contact point of each tooth pair, tooth surface modification amount S and transmission error e. The tooth surface modification amount S at the contact point is calculated for each tooth pair within the angular range between the start and end of mesh of the tooth pair. Curves of the calculated tooth surface modification amount S of the three tooth pairs are shown in FIG. 4 at the angular pitch. The transmission error is taken along the ordinate while the rotational angle is taken along the abscissa. The following formula (7) is obtained from the relationship of displacement of FIG. 4:

$$e = S_1 + \delta_1 = S_2 + \delta_2 = \ldots = S_m + \delta_m \quad (7)$$

Where $K_j$ represents an influence function of a total amount of deformation consisting of the bending deflection and the approach deformation, the value $\phi_j$ is obtained as a product of $K_j$ and $P_{nj}$, so that the following formula (8) for calculating the shared loads $P_{nj}$ of the tooth pair j can be obtained from the formulas (5) and (7):

$$P_{nj} = \frac{S_1 - S_j}{K_j} + \frac{K_1}{K_j} \cdot \frac{\left\{P_n r_{b0} - \sum_{k=2}^{m} \left(\frac{S_1 - S_k}{K_k} r_{bSk}\right)\right\}}{\sum_{k=1}^{m}\left(\frac{K_1}{K_k} r_{bSk}\right)} \quad (8)$$

[Process of Calculation]

Figure 5:
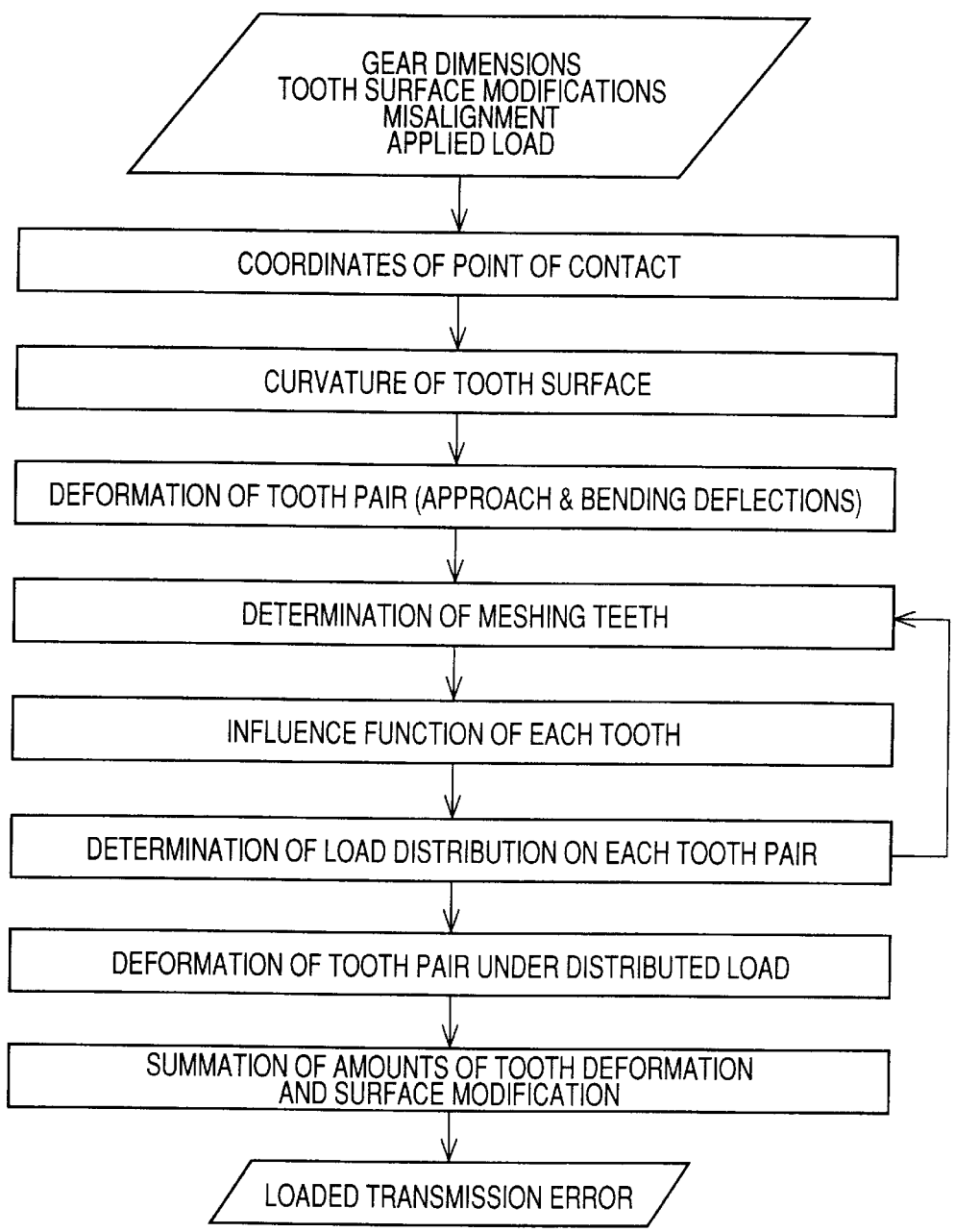
FIG. 5 is a flow chart illustrating a process of calculating loaded transmission error.

To determine the shared loads and the meshing tooth pairs, it is necessary to take into account the non-linearity of the amount of deformation with respect to the load. A process of calculating the loaded transmission error is shown in FIG. 5. Each pair of simultaneously meshing teeth can be identified by the amount of deformation (approach and bending deflections) based on the coordinates of the contact point of the tooth pair and the curvature of the tooth surface, and the influence function of deformation of each tooth pair is obtained using equally distributed loads. The shared loads are obtained according to the formula (8), and the obtained shared loads are used to re-calculate the influence function of the deformation and shared loads. Where some of the negative shared load value, are negative, the tooth pair is compensated to obtain the shared loads again, for determining the tooth pair and its shared loads.

[Calculation of Approach Deformation]

The approach deformations can be calculated using the Hertzian formulas. The radii of curvature of the modified tooth surfaces at the center $O_s$ of the contact ellipse are obtained with the following procedure. The modified tooth surface is defined in the coordinate system of FIG. 1, using the following formulas (9) and (10) which include the tangent line length $q_s$ and the radius $r_{b^0}$ of the base circle. The tangent line length $q_s$ is obtained according to the following formula (11), by adding the tooth surface modification amount S to the length q without an error. The radius $r_{bs}$ of the instantaneous base circles in the formula (5) is represented by the following formula (12):

$$x(\theta, \phi) = \{u(\theta, \phi), v(\theta, \phi), w(\theta, \phi)\} \quad (9)$$

$$\begin{cases} u(\theta, \phi) = -q_s(\theta, \phi)\cos(\alpha + \theta) + r_{b0}\sin(\alpha + \theta) \\ v(\theta, \phi) = q_s(\theta, \phi)\sin(\alpha + \theta) + r_{b0}\cos(\alpha + \theta) \\ w(\theta, \phi) = \frac{L_e}{2\pi}\phi \end{cases} \quad (10)$$

$$q_s(\theta, \phi) = q(\theta, \phi) + S(\theta, \phi) \quad (11)$$
wherein $$\begin{cases} q(\theta, \phi) = q_0 + r_{b0}\theta \\ S(\theta, \phi) = -d_0\theta^2 - c_0\phi^2 - b_0\phi\theta + a_1\theta + a_2\phi \end{cases} \quad (12)$$

$$r_{bS} = dq_s(\theta, \phi)/d\theta = r_{b0} - 2d_0\theta - b_0\phi + a_1$$

First fundamental amounts E, F and G and second fundamental amounts L, M and N are obtained according to the formulas (10) and (11), and principal curvature radii r and r' at $O_s$ are obtained according to the following formula (13):

$$r, r' = \frac{1}{2}\left\{-\frac{EN + GL - 2FM}{M^2 - LN} \pm \sqrt{\left(\frac{EN + GL - 2FM}{M^2 - LN}\right)^2 - \frac{4(F^2 - EG)}{M^2 - LN}}\right\} \quad (13)$$

wherein $E = x_\theta \cdot x_\theta,$ $F = x_\theta \cdot x_\phi,$ $G = x_\phi \cdot x_\phi,$ $L = \dfrac{|x_{\theta\theta} x_\theta x_\phi|}{\sqrt{EG - F^2}},$ $M = \dfrac{|x_{\theta\phi} x_\theta x_\phi|}{\sqrt{EG - F^2}},$ $N = \dfrac{|x_{\phi\phi} x_\theta x_\phi|}{\sqrt{EG - F^2}},$ $x_\theta$: partial derivative of $x$ with respect to $\theta$ $x_\varphi$: partial derivative of $x$ with respect to $\varphi$ The load distribution on the contact ellipse follows the Hertzian pressure distribution, and the amount of the approach deformation is obtained according to the following Hertzian formula (14). "$r_i$" and "$r_i'$" represent radii of principal curvatures, and $E_i$ represents a modulus of longitudinal elasticity of the gear material. "$\upsilon_i$" represents a Poisson's ratio, $K(\epsilon)$ represents a complete elliptic integral of the first kind, and "$\mu$" represents a Hertzian constant. Subscripts "1" and "2" indicate the drive and driven gears, respectively.

$$\delta_c = \frac{2K(\varepsilon)}{\pi\mu} \cdot \sqrt[3]{\frac{9}{16} P_{nj}^2 (A + B)\left(\frac{1 - \nu_1^2}{E_1} + \frac{1 - \nu_2^2}{E_2}\right)^2} \quad (14)$$

wherein $$A + B = \frac{1}{2}\left(\frac{1}{r_1} + \frac{1}{r_1'} + \frac{1}{r_2} + \frac{1}{r_2'}\right)$$

[Calculation of Bending Deflection]

The bending deflection amount $\delta_b$ is obtained according to the following formula (15) which uses an influence function $K_{bi}$ of bending and the shared loads $P_{nj}$. The shared loads $P_{nj}$, which are assumed to follow the Hertzian pressure distribution, are obtained according to the following formula (16). It is noted that the x'-y' coordinates are taken in the directions of the axes of the contact ellipse, and "$2a_H$" and "$2b_H$" represent the lengths of the major and minor axes of the contact ellipse, respectively. $K_b{}^1$ and $K_b{}^2$ represent the influence functions of the drive and driven gears, respectively.

$$\delta_b(\xi, \eta) = \int_{-b_H}^{b_H}\int_{-a_H}^{a_H} K_b(x', y', \xi, \eta) P_{nj}(x', y') dx' dy' \quad (15)$$

wherein $K_b(x, y, \xi, \eta) = K_{b1}(x, y, \xi, \eta) + K_{b2}(x, y, \xi, \eta)$ $$P_{nj}(x', y') = \frac{3P_{nj}}{2\pi a_H b_H} \sqrt{1 - \frac{x'^2}{a_H^2} - \frac{y'^2}{b_H^2}} \quad (16)$$

Figure 6:
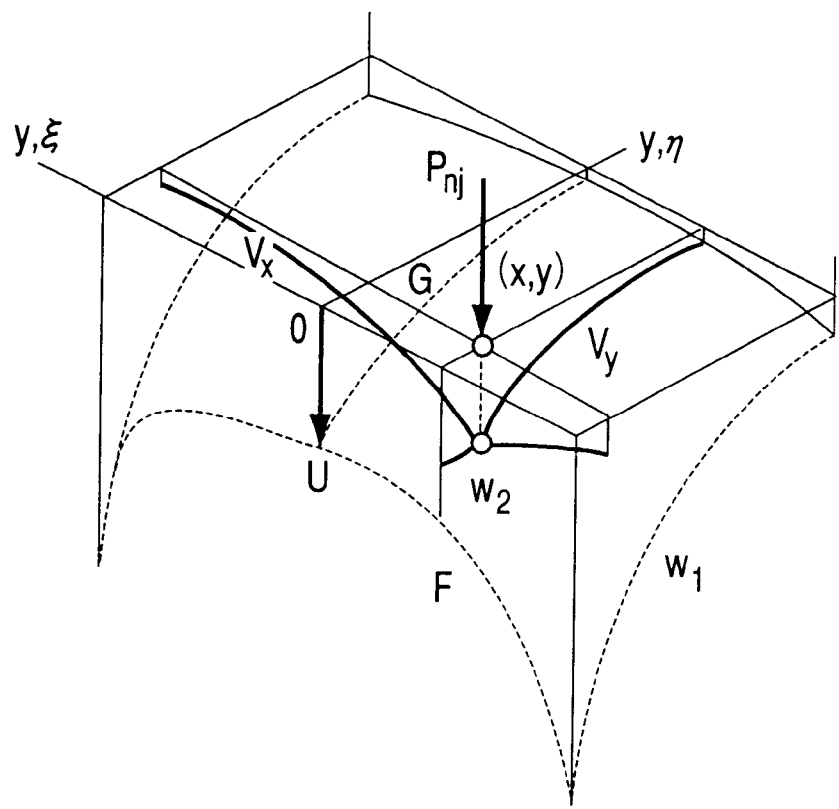
FIG. 6 is a view for explaining a relationship between distributions of deflection and approximating formula, upon calculation of bending deflection.

$K_{bi}$ represents the influence function of the bending deflection of each tooth at ($\xi$, $\eta$) when a load is concentrated at point (x, y). The x'-y' coordinates are converted into x-y coordinates. The formula (15) represents the amount of bending deflection of the tooth pair where the center of the contact ellipse is located at the coordinates ($\xi$, $\eta$). $K_{bi}$ is represented by the following formula (17), as a product of deflection U with a load acting on the tooth top at the center of the face width, distribution $w_1$ of deflection right under the load point, and distribution $w_2$ of deflection about the load point. A relationship between the deflection distributions and approximating formula is shown in FIG. 6. "$w_1$" is a product of a function G of deflection in the direction of the tooth surface and a function F of deflection in the direction of the tooth lead. "$w_2$" represents a product of a function Vx of deflection distribution of the tooth lead and a function Vy of deflection distribution of the tooth surface. The functions G and F are standardized by the deflection U at the center of the face width and on the tooth top, while the functions Vx and Vy are standardized by the deflection right under the load point. Where the load point is located at the coordinates (x, y), the functions $w_1$ and $w_2$ at the coordinates ($\xi$, $\eta$) are represented by the following formulas (18).

$$K_{bl}(x, y, \xi, \eta) = U w_1(\xi, \eta) w_2(x, y, \xi, \eta) \quad (17)$$

$$\begin{cases} w_1(\xi, \eta) = F(\xi)G(\eta) \\ w_2(x, y, \xi, \eta) = V_x(|x - \xi|, |y - \eta|)V_y(|y - \eta|) \end{cases} \quad (18)$$

Figure 7:
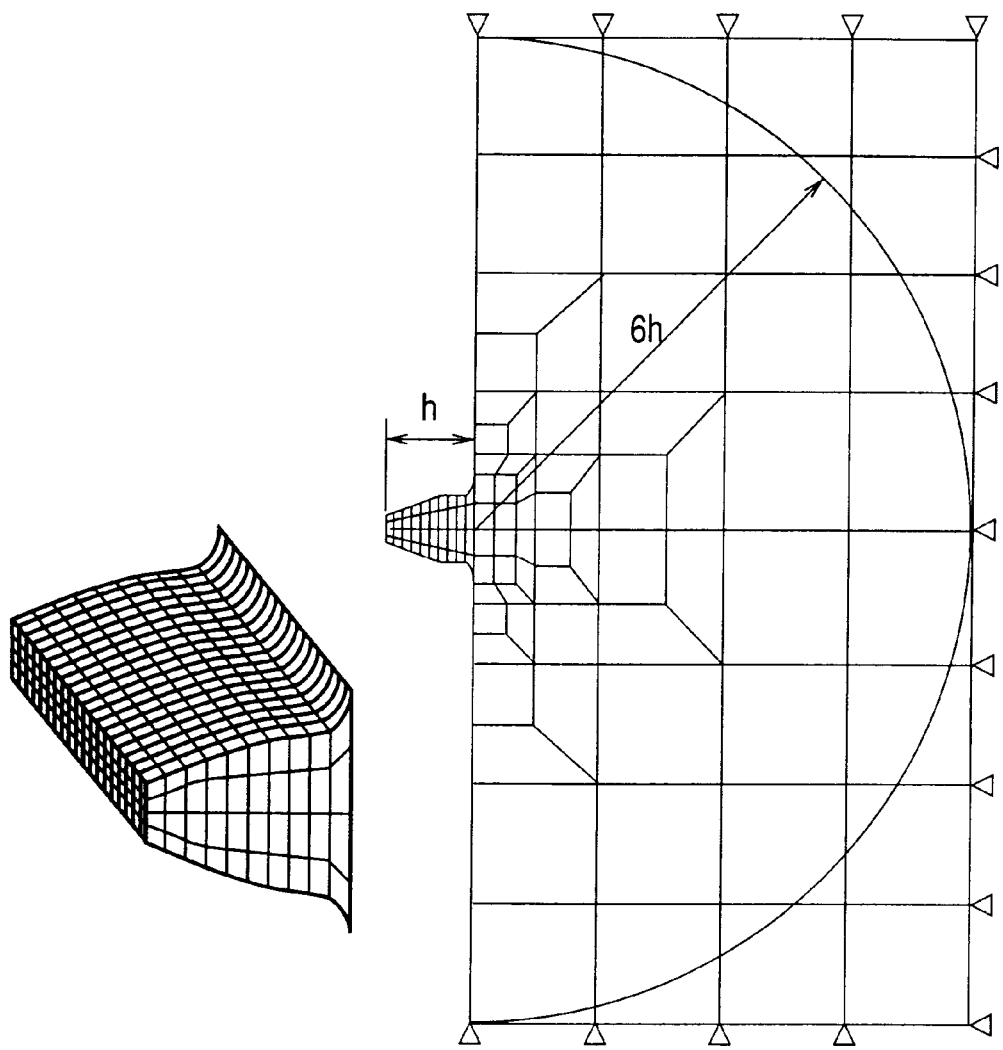
FIG. 7 is a view illustrating a FED model of an equivalent spur gear.

The forms and coefficients of the functions in the formula (18) are determined using the tooth deflections obtained by FEM. In the FEM, a model of an equivalent spur gear as shown in FIG. 7 was used. The model used consists of solid elements having three degrees of freedom, which are obtained by dividing the tooth depth into 10 divisions and the face width into 20 divisions. The base portion, which is a block which is six times as large as the tooth depth, was bound at its upper, lower and back surfaces. A unit load was concentrated on a central part of the tooth surface, acting in the vertical direction, and the approximating formula was obtained from the deflection amounts. Upon calculation of the deflection amounts, they are converted into the values of deflection in the direction normal to the tooth surface.

The forms and coefficients of the functions G, F, Vx, Vy were determined using about 20 kinds of gears for use on automotive vehicles. These functions are represented by the following formulas (19), which include exponential functions of x or y. The function Vx is a function of x and y based on a result of the FEM analysis.

$$\begin{cases} F(x) = \exp(C_1 x^4) \\ G(y) = \exp(C_2 y) \\ V_x(x, y) = \frac{1}{3} \sum_{i=1}^{3} \exp(D_1 x^2) \\ V_y(y) = \exp(C_9 y) \end{cases} \quad (19)$$

wherein $$\begin{cases} D_1 = C_3 / C_4 y^{1.5} + 1 \\ D_2 = C_6 y^{1.5} + 1 \\ D_3 = C_7 / C_8 y \end{cases}$$

Figure 8:
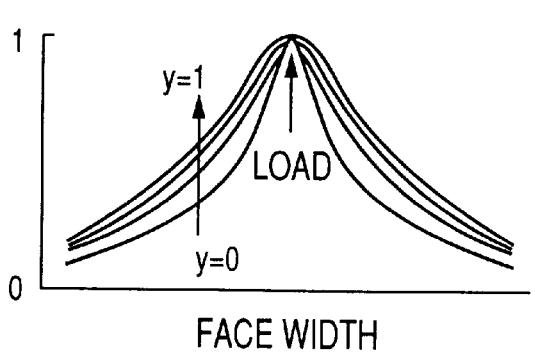
FIGS. 8 are views indicating examples of a distribution of bending deflection obtained by FEM.
Figure 8:
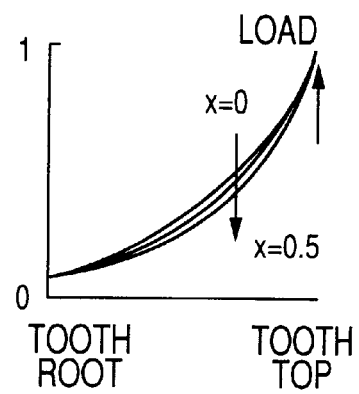

FIGS. 8 show examples of distribution of bending deflection obtained by FEM, using a gear having 40 teeth which have a normal-to-tooth module of 2, a pressure angle of 20°, a tooth depth of 4.9 mm and a face width of 22.5 mm. FIG. 8(a) shows the distributions of bending deflection in the direction of the tooth lead, when the load point is located at position y on the tooth surface at the center of the face width, while FIG. 8(b) shows the distributions of bending deflection in the direction of the tooth profile, when the load point is located at face width position x on the tooth top. The positions x and y are standardized by the face width and tooth depth, while the amount of deflection is standardized by the deflection right under the load point. It will be understood from the figures that the pattern of the distribution in the direction of the tooth lead depends on the position y, while the distribution in the direction of the tooth profile is less likely to be influenced by the position x. Since similar results were obtained for gears having different specifications, the function Vx is expressed as a function of both of x and y, while the function Vy is expressed as a function of y only.

Figure 9:
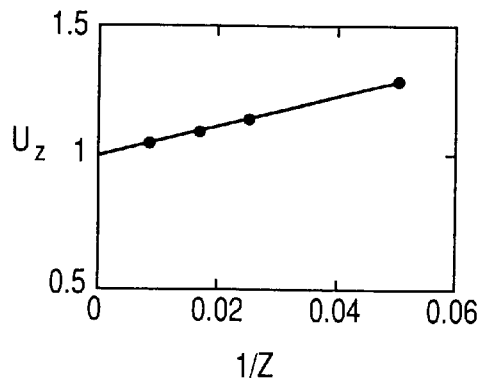
FIGS. 9 are views indicating examples of relationships between coefficients $U_z$, $U_a$, $U_h$ and $U_b$, and teeth number Z, pressure angle α, tooth depth h and face width b.
Figure 9:
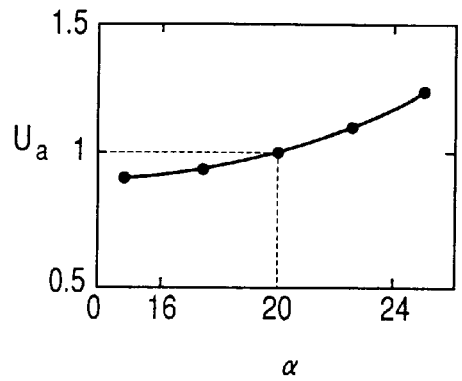
Figure 9:
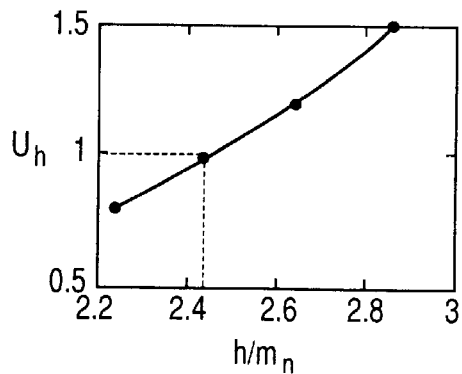
Figure 9:
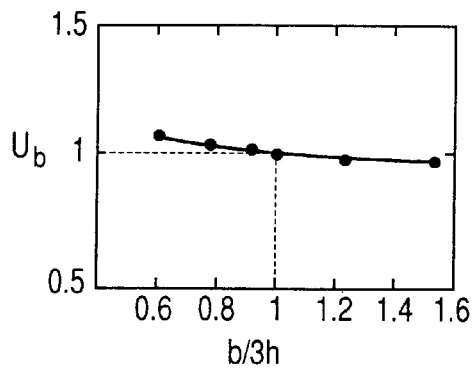

The coefficients of the functions were determined based on the result of the FEM calculation, while attaching importance to the accuracy of the deflection in the neighborhood of the center of the face width. The value U in the formula (17) and the coefficient $C_i$ in the formulas (19) are expressed as products of coefficients which reflect the specifications of the gear. For instance, the value U is represented by the following formula (20), which includes coefficients $U_z$, $U_h$, $U_b$ and $U_a$ (a used in place of $\alpha$ for the sake of convenience) which reflect the number z of the teeth, tooth depth h, face width b and pressure angle $\alpha$, and a coefficient $U_0$ which is the deflection amount of the gear whose number of teeth is infinite. The coefficients $U_z$, $U_h$, $U_b$, $U_a$ are represented by polynominals including z, h, b and $\alpha$. FIGS. 9 show examples of relationships between the coefficients $U_z$, $U_h$, $U_b$, $U_a$ and the gear specifications. Broken lines in FIGS. 9 indicate reference values of the tooth specifications. "$m_n$" in FIG. 9(c) represents the normal-to-tooth module.

$$U = U_0 U_z(z) \; U_a \, (\alpha) \; U_h \, (h) \; U_b \, (b) \quad (20)$$

Figure 10:
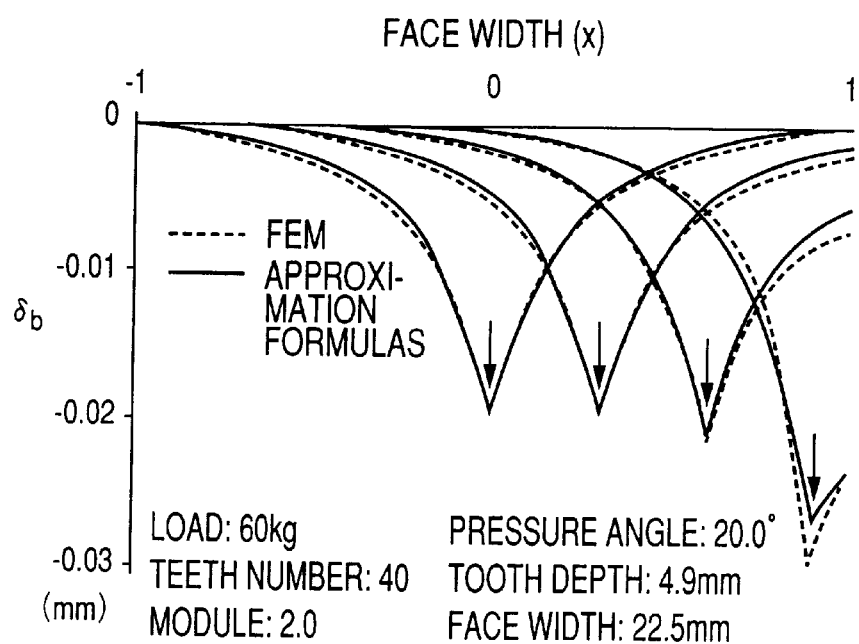
FIG. 10 is a view indicating examples of a distribution of bending deflection as calculated according to an approximating formula, upon concentration of a load on tooth top.

FIG. 10 shows examples of distribution of the bending deflection as calculated according to an approximating formula when a load is concentrated on the tooth top. Solid lines indicate the bending deflection calculated according to the approximating formula, while broken lines indicate the bending deflection according to a result of the FEM analysis. Arrows in the figure indicate the load points. Near the end portions of the face width, the bending deflection calculated according to the approximating formula tends to be smaller than that according to the FEM analysis. In the central portion of the face width in which the contact of the teeth takes place, the bending deflections right under the load points and their distributions according to the approximating formula and the FEM analysis highly coincide with each other.

Figure 11:
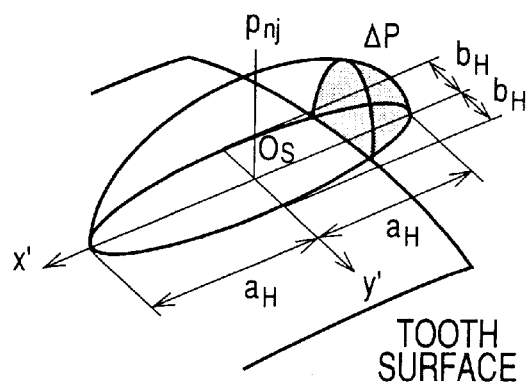
FIG. 11 is a view for explaining an example of edge contact of teeth wherein an end portion of contact ellipse is located outside the tooth surface.

[Handling of Edge Contact]

Where the contact of a tooth pair takes place near the tooth top or the ends of the face width, a portion of the contact ellipse is located outside the tooth surface, as indicated in FIG. 11. In this case, deflection of the tooth pair is considered to arise from the load value which is the shared load $P_{nj}$ minus $\Delta P$, and the influence function $K_j$ of deflection is compensated according to the following formula (21), so as to reflect reduction in the rigidity of the tooth pair near the tooth top and the ends of the face width.

$$K_j = \delta_j/(P_{nj} - \Delta P) \tag{21}$$

<Analysis by Experiments>

Figure 12:
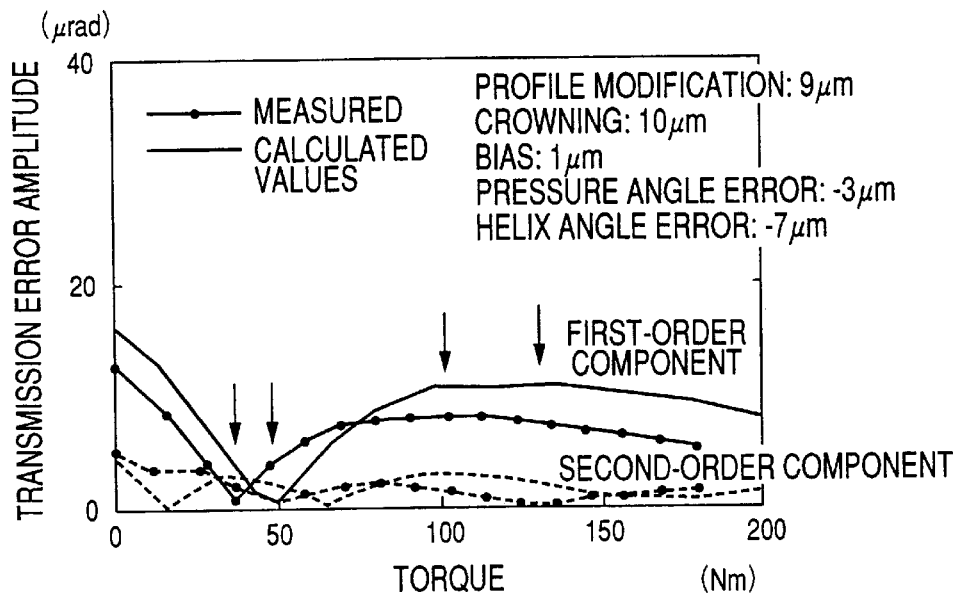
FIGS. 12 are views indicating first-order and second-order components of transmission error obtained by Fourier analysis of actually measured values, together with the calculated values.
Figure 12:
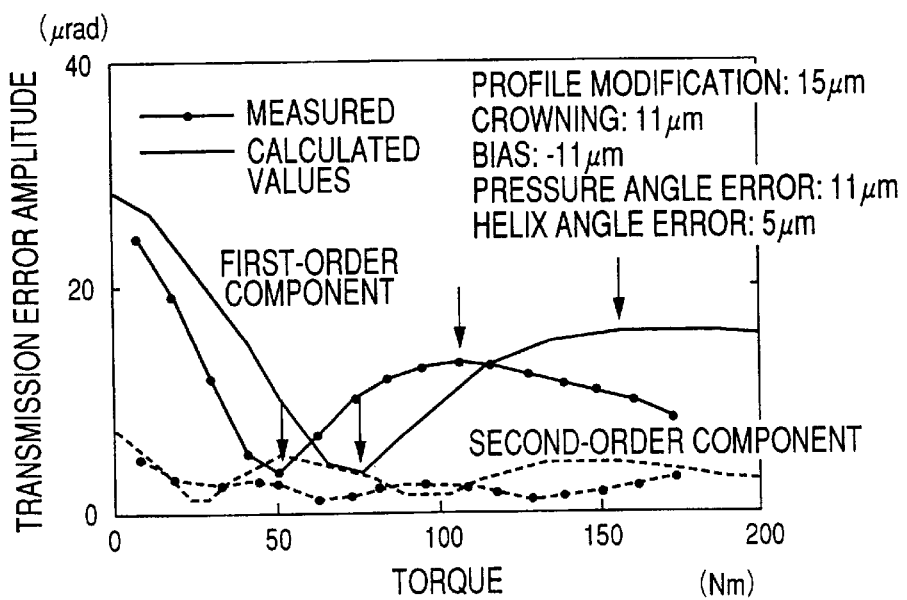

Transmission errors of gears in a one stage speed reducing gear device having a highly rigid housing were measured. The measured values were compared with calculated values. The speed reducing gear device was loaded by weights connected to pulleys mounted on end portions of input and output shafts of the device. The transmission errors were measured while the shafts were slowly rotated, such that an influence of vibrations of a measuring instrument was minimized. The measurement was effected for a pair of gears Nos. 1 and 2 indicated in Table 1, whose speed reduction ratio (gear ratio) is equal to 1. To reduce variations from tooth to tooth of the gear pair, the tooth surfaces were hardened by carbulizing treatment and then ground by a Maag grinder. Average values of the transmission errors measured on the tooth surfaces are indicated in FIGS. 12. The standard deviation of the measured transmission error values of the teeth was 0.5μm or smaller. The measured transmission errors were subjected to Fourier analysis, and first-order and second-order components of the transmission errors are indicated in FIGS. 12, together with the calculated values. The measurements had a variation on the order of several μrad, and the measured values indicated in FIGS. 12 are those in a central portion of the variation

TABLE 1

|  | NO. 1 | NO. 2 | NO. 3 | NO. 4 | NO. 5 |
|---|---|---|---|---|---|
| Number of teeth | 98 | 53 | 29 | 29 | 43 |
| Center distance | 120.0 | 120.0 | 66.1 | 66.1 | 66.1 |
| Normal module | 1.15 | 2.03 | 2.03 | 2.03 | 1.37 |
| Normal pressure angle | 20.0 | 16.5 | 18.0 | 18.0 | 18.0 |
| Helix angle | 20.0 | 26.0 | 27.0 | 27.0 | 27.0 |
| Tooth depth | 2.8 | 6.65 | 5.6 | 6.5 | 4.6 |
| Face width | 20.0 | 20.0 | 18.0 | 18.0 | 18.0 |
| Base circle diameter | 118.8 | 113.7 | 62.1 | 62.1 | 62.1 |
| Transverse contact ratio | 1.60 | 2.09 | 1.78 | 2.08 | 2.18 |
| Overlap contact ratio | 1.89 | 1.38 | 1.28 | 1.28 | 1.90 |
| Gear ratio | 1.0 | 1.0 | 1.0 | 1.0 | 1.0 |

The first-order components of the measured transmission error values of the two gears Nos. 1 and 2 change with the load value, and have maximal and minimal points. The first-order components of the calculated values have a similar tendency and qualitative similarity to those of the measured values. However, the difference between the load values at which the amplitudes of the measured and calculated transmission errors have the maximal and minimal points as indicated by arrows is not negligible. This may be because the calculation ignores the deflections of the gears, gear shafts and bearings. The measured values include the deflections of the components of the speed reducing gear device, and are based on lower rigidity values of those components, so that the minimal points of the measured transmission error values correspond to smaller load values, as indicated in FIGS. 12.

<Definition of Actual Contact Ratio $\epsilon_r$>

Figure 15:
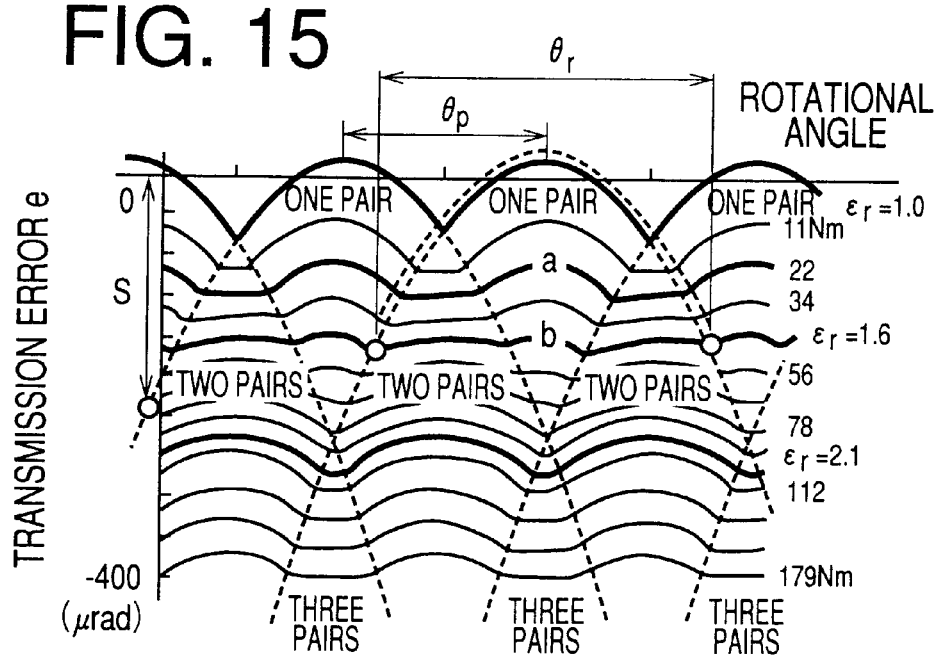
FIG. 15 is a view indicating mutually superimposed waveforms of transmission load calculated for each load and tooth surface modification amount S.

The actual contact ratio $\epsilon_r$ is defined as the angular range $\theta_r$ in which the teeth of the gear pair actually contact each other, divided by the angular pitch $\theta_p$ (See FIG. 15). The actual contact ratio $\epsilon_r$ is represented by the following formula (22) wherein subscripts "1" and "2" indicate the drive and driven gears, respectively.

$$\epsilon_r = \theta_{r1}/\theta_{p1} = \theta_{r2}/\theta_{p2} \tag{22}$$

There will be considered the driven gear which is to be given tooth surface modification Since the actual contact ratio $\epsilon_r$ varies with the load, the actual contact ratio is distinguished from a geometrical contact ratio (total contact ratio) $\epsilon_t$ which is determined by the specifications of the gear.

Figure 13:
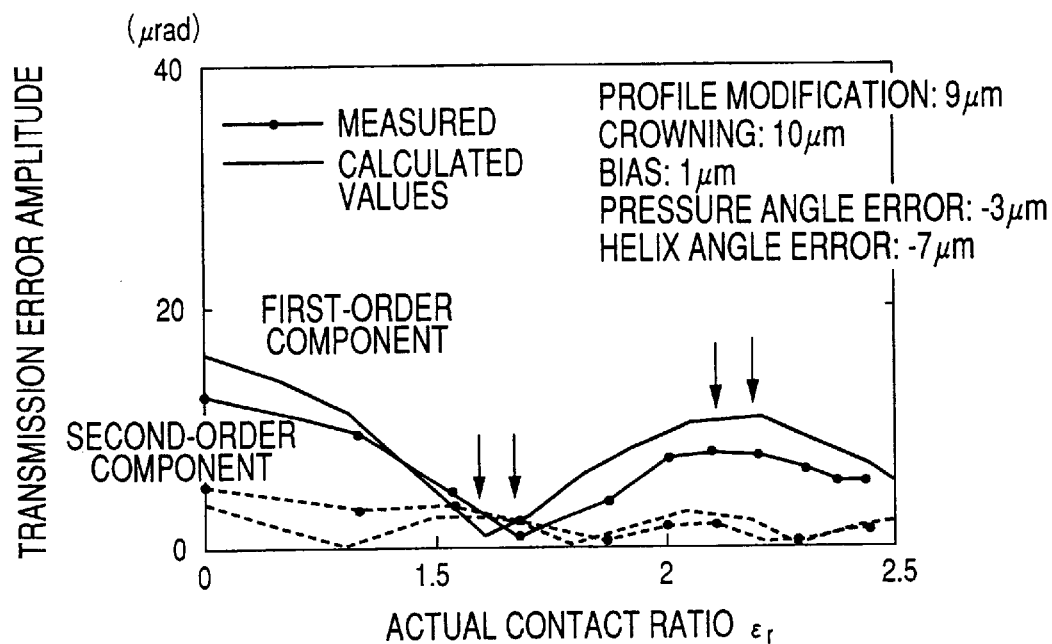
FIGS. 13 are graphs wherein actual contact ratio $\epsilon_r$ is taken along the abscissa.
Figure 13:
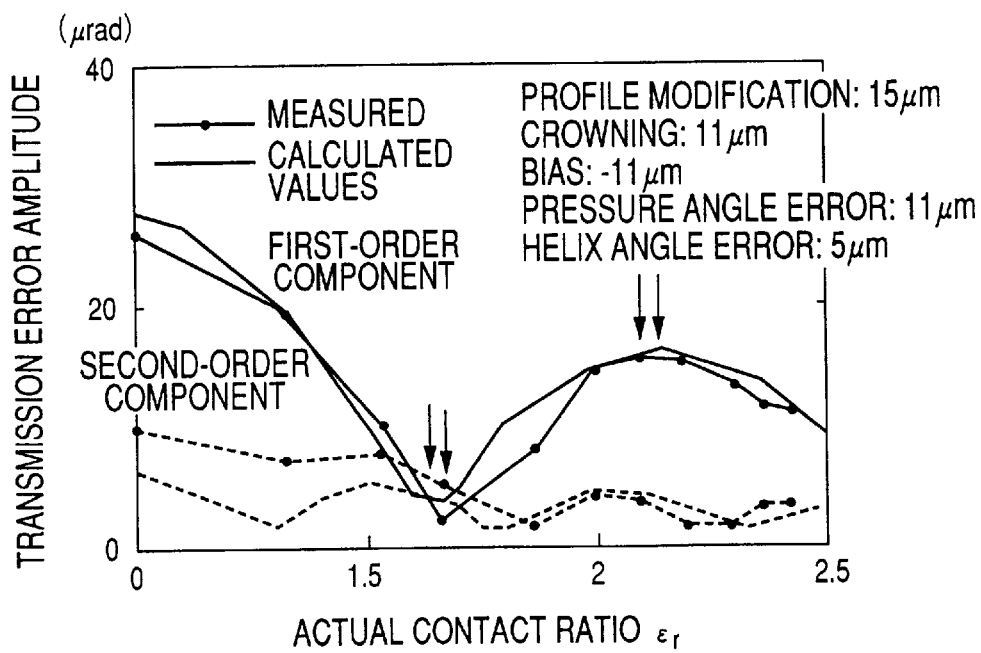
Figure 14:
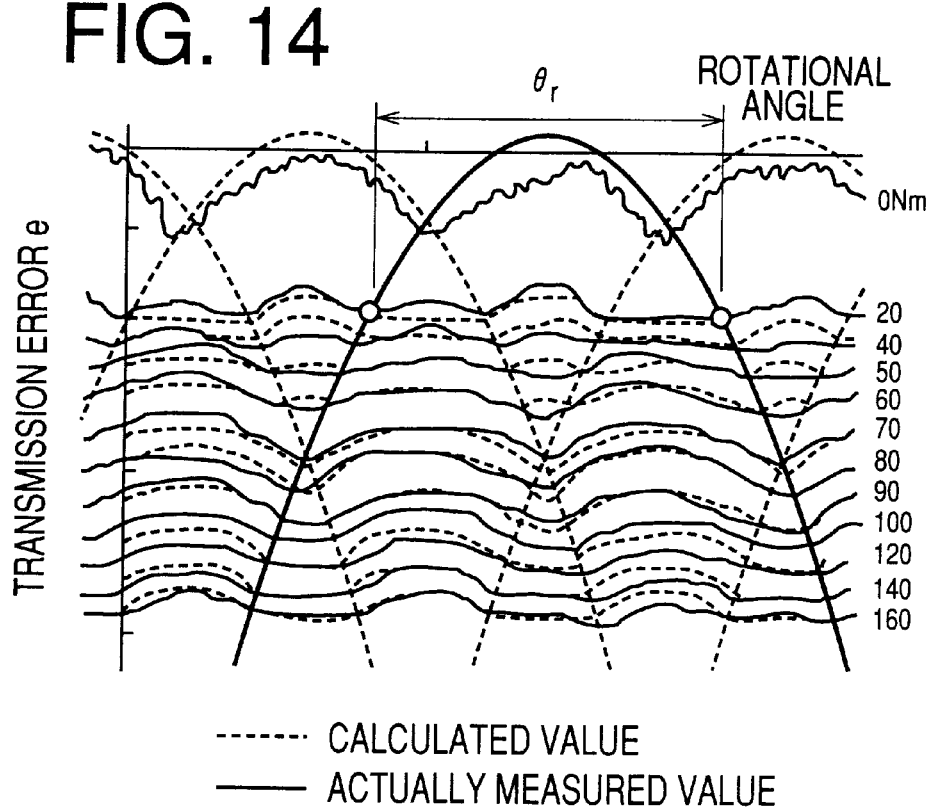
FIG. 14 is a view indicating waveforms of actually measured transmission load values used as the actually measured values in FIGS. 12 and 13.

By obtaining the change of the transmission error amplitude with the load in relation to the actual contact ratio $\epsilon_r$, characteristics common to the measured and calculated values are clarified. FIGS. 13 show the measured transmission error amplitude of FIGS. 12 in relation to the actual contact ratio $\epsilon_r$. Curves of the calculated transmission error amplitude have portions which are not smooth. However, the curves may be smoothed by reducing the increments of the load or angular pitch. The actual contact ratio $\epsilon_r$ was obtained from waveforms of actually measured transmission error values as shown in FIG. 14. In this figure which relates to the gear No. 1, the waveforms of the measured load values of the gear No. 1 are also shown such that the troughs of the waveforms which appear due to a change in the number of the meshing teeth lie on the curve of the tooth surface modification amount S. As indicated in FIG. 14, the rotational angle $\theta_r$ was obtained from the positions at which the number of the meshing teeth changes. The actual contact ratio $\epsilon_r$ was obtained from the thus obtained rotational angle $\theta_r$. The load values in FIG. 14 were actually measured, and the curve of the tooth surface modification amount S was obtained in the same manner as in the case of FIG. 4. It will be understood from data of FIGS. 13 of the two gears that the values of the actual contact ratio $\epsilon_r$ at which the actually measured transmission error 5 has maximal and minimal values are substantially the same with those of the calculated transmission error values. It will also be understood that the actual contact ratio $\epsilon_r$ at which the first-order component of the transmission error has the minimal and maximal points are about 1.6 and 2.1, respectively. The calculated transmission error amplitudes tend to be slightly larger, but have relatively high similarity to the measured values over the entire range of the load. Similarly, relatively high similarity is recognized with respect to the second-order component between the calculated and measured values.

<Influence of Loads on Transmission Error>

There will be considered influences of the load on both the waveform and the amplitude of the transmission error.

[Waveform of Transmission Error]

In FIG. 15, there are shown waveforms of the transmission error values of the gear No. 2 calculated for different load values at each rotational angle, and waveforms of the tooth surface modification amount S obtained in the same manner as in the case of FIG. 4, such that those waveforms are superimposed on each other. Under the non-load condition, the tooth contact proceeds following the waveform of the tooth surface modification amount S of one of the tooth pairs which has the smallest amount of retard, and the actual contact ratio $\epsilon_r$ in this case is equal to 1.0. When a load acts on the meshing gears, the angular range $\theta_r$ of the tooth contact is increased due to deflection of the tooth pair, and the actual contact ratio $\epsilon_r$ is accordingly increased. the number of the pairs of the meshing teeth changes at the intersections with the waveform of the tooth surface modification amount S, and the waveforms of the transmission error change accordingly. In the case of the waveform indicated at "a" in the figure, the number of the meshing tooth pairs alternately changes between one and two. In this case, the amplitude of the transmission error is smaller than in the case without load application In the case of the waveform indicated at "b" in the figure, the transmission error when one pair of teeth is in mesh has substantially the same amplitude as that when the two pairs of teeth are in mesh. In this case, the amplitude of the transmission error is minimal, and the actual contact ration $\epsilon_r$ is about 1.6. When the actual contact ratio $\epsilon_r$ is increased to 2.0 due to an increase in the load value, the number of the meshing tooth pairs remains unchanged, and the amplitude of the transmission error is maximal. Actually, the amplitude of the transmission error has a minimal and a maximal point at the contact ratio value which is more or less different from the 1.5 and 2.0. This is because the transmission error has different waveforms depending upon whether the number of the meshing tooth pairs is equal to one or two. Similar characteristics are seen also when the number of the meshing tooth pairs changes alternately between two arid three, under a higher load.

[Amplitude of Transmission Error]

Figure 16:
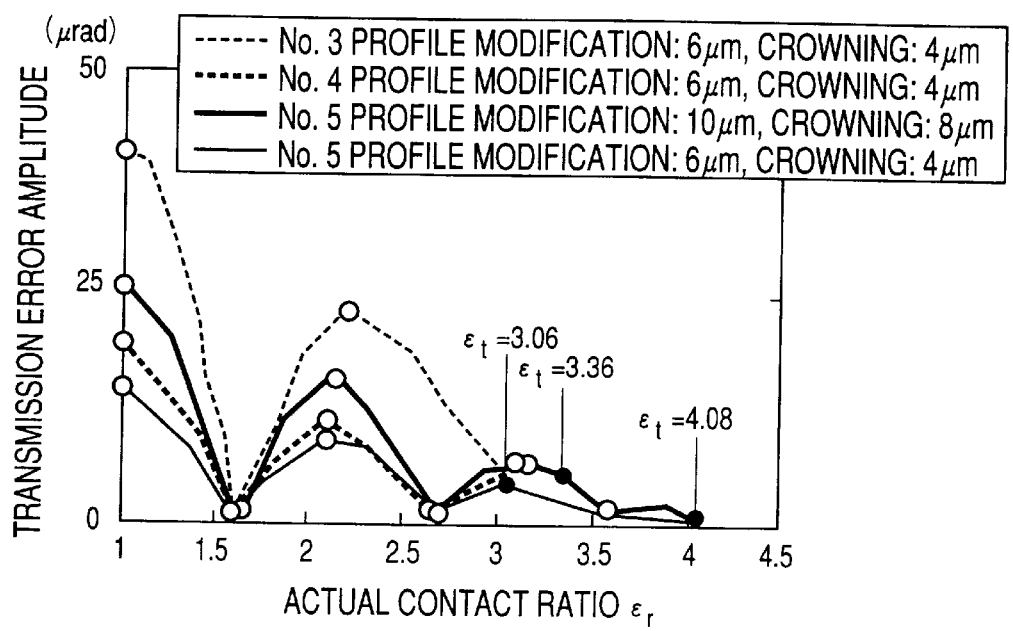
FIGS. 16 are views indicating examples of relationships between amplitudes of first-order and second-order components of transmission error and actual contact ratio $\epsilon_r$.
Figure 16:
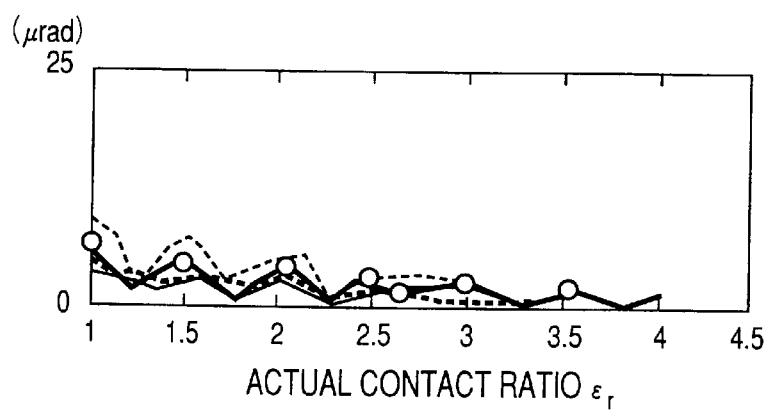

There will be analyzed relationships between the actual contact ratio $\epsilon_r$ and the transmission error amplitude, using gear pairs having different specifications and tooth surface modifications. FIGS. 16 show relationships between the actual contact ratio $\epsilon_r$ and the calculated first-order and second-order components of the transmission error of the gears Nos. 3 and 4 in Table 1 having different tooth depth values, and of the two gears No. 5 which have a higher geometrical contact ratio. The two gears No. 5 have different profile modification amounts and different crowning amounts. "o" marks in the figures indicate the minimal and maximal points (only the maximal points of the second-order components). It will be understood from the figures that the relationships between the transmission error amplitude and the actual contact ratio $\epsilon_r$ have the following characteristics:

(i) The actual contact ratio $\epsilon_r$ varies between 1.0 and the geometrical contact ratio $\epsilon_t$, depending upon the load applied, and the amplitude of the transmission error accordingly varies.

(ii) The values of the actual contact ratio $\epsilon_r$ at which the first-order component of the transmission error amplitude has the maximal and minimal points are substantially the same for the different gear pairs. The actual contact ratio $\epsilon_r$ about 2 and about 3 when the first-order component has the maximal points, and is about 1.6 when the first-order component has the minimal points. Where the geometrical contact ratio $\epsilon_t$ is high, the first-order component has minimal points also at the actual contact ratio $\epsilon_r$ of 2.7 to 2.8. Assuming that the amplitude under the non-load condition is one of the maximal points, there exists a feature that the first-order component of the transmission error has maximal points when the actual contact ratio $\epsilon_r$ is an integer or a value to the integer, and has minimal points when the actual contact ratio is a value between integers.

(iii) The second-order component of the transmission error has maximal points which are spaced apart from each other in the direction of the actual contact ratio $\epsilon_r$ at an interval which is one half the interval of the first-order component. The positions of the maximal points of the second-order component correspond to the positions of the maximal and minimal points of the first-order component. The second-order component is predominant over the first-order component, at the positions of the minimal points of the first-order component.

(iv) The maximal values of both of the first-order and second-order components of the transmission error amplitude increase with an increase in the amplitude under the non-load condition.

(v) The maximal values are the largest under the non-load condition, and decrease with an increase in the actual contact ratio $\epsilon_r$. This may be because the load is distributed to the plurality of tooth pairs, causing the transmission error amount of each tooth pair to be averaged.

(vi) Accordingly, the amplitude of the transmission error under the non-load condition is representative of the maximal value of the amplitude of the loaded transmission error.

The characteristics described above are also seen in the measured values of FIGS. 13, and are considered to be general properties of transmission error.

The analysis which has been described indicates that a gear having a reduced transmission error over the entire range of the load can be efficiently and easily designed, without performing simulations or tests, by determining the specifications and the tooth surface modification of the gear so as to minimize the transmission error amplitude under the non-load condition in which the actual contact ratio $\epsilon_r$ is 1.0.

<Definition of Effective Contact Ratio $\epsilon_n$>

Like the transmission error which is an error amount considered on the path of the contact point, the contact ratio can be defined using the path of the contact point. The effective contact ratio $\epsilon_n$ is defined as the angular range $\theta_n$ divided by the angular pitch $\theta_p$, where the angular range $\theta_n$ is a range in which the edge contact (partial contact) of the tooth pair does not take place at the tooth top or at the ends of the face width. The effective contact ratio $\epsilon_n$ is represented by the following formula (23) wherein subscripts "1" and "2" indicate the drive and driven gears, respectively:

$$\epsilon_n = \theta_{n1}/\theta_{p1} = \theta_{n2}/\theta p2 \qquad (23)$$

There will be considered the effective contact ration of the driven gear, in relation to the actual contact ratio $\epsilon_r$ and the tooth surface modification.

Figure 17:
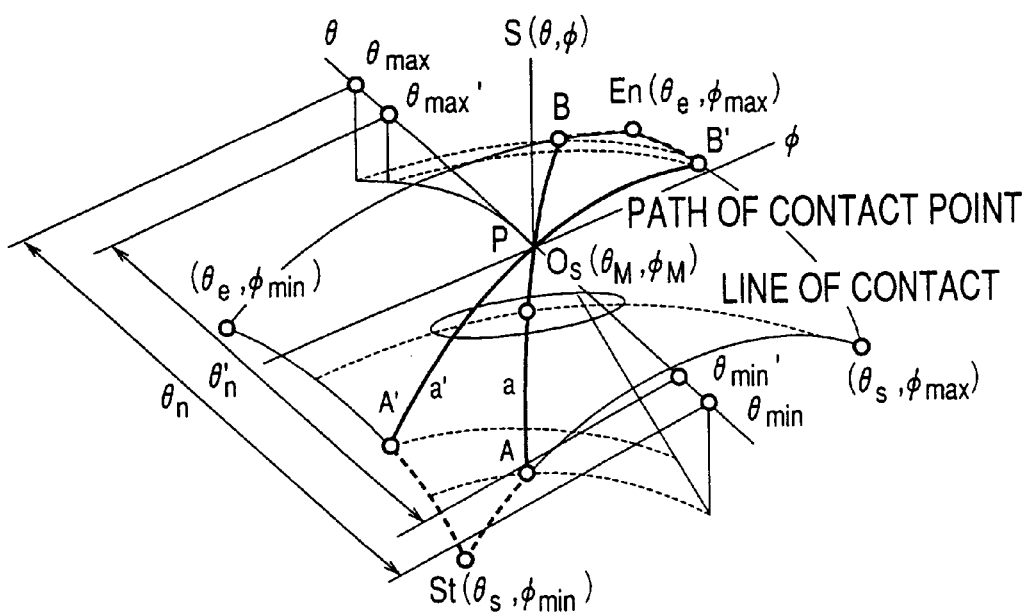
FIG. 17 is a view for explaining an angular range θn which in which partial contact does not take place on a path of contact point.

The effective contact ratio $\epsilon_n$ is obtained using the path of the contact point under the non-load condition, and is therefore an index which depends on only the geometry of the gear pair determined by the specifications and tooth surface modification and which does not depends on the load. The effective contact ratio is also an index which is the geometrical contact ratio $\epsilon_t$ as changed by the tooth surface modification, so that the transmission error directly corresponds to the specifications of the gear pair. The effective contact ratio $\epsilon_n$ is defined in terms of the angle corresponding to the transmission error. FIG. 17 shows relationships between paths of the contact point and the effective contact ratio $\epsilon_n$. In the example of the figure wherein the different paths a and a' are indicated, the contact point is assumed to move from point St to point En.

Thick solid lines in the figure indicate regions in which the contact point lies on the tooth surface, while broken lines indicate regions in which the edge contact (partial contact) takes place on the tooth top or at the ends of the face width. In the case of the path a, points A and B are transient points at which the rotational angle $\theta$ is $\theta_{min}$ and $\theta_{max}$, respectively. The rotational angle values $\theta_{min}$ and $\theta_{max}$ have four combinations for the paths a and a', depending on whether the contact point is located on the tooth top, at the tooth root or at the ends of the face width. The angular range $\theta_n$ is defined by the points A and B, and is represented by the following formula (24). The angular pitch $\theta_p$ is represented by the following formula (25) which includes the number $Z_2$ of teeth of the driven gear. In the case of the path a in the figure, the rotational angle values $r_{min}$ and $\theta_{max}$ can be obtained by solving the following formulas (26) which include limits $\theta_s$ and $\theta_e$ of the angle $\theta$ corresponding to the points St and En. In the case of the path a', the rotational angle values $r_{min}$ and $\theta_{max}$ can be obtained by solving the following formulas (27) which include limits $\phi_{max}$ and $\phi_{min}$ of phase angle $\phi$. Thus, the angular range $\theta_n$ and the effective contact ratio $\epsilon_n$ can be obtained. While the formulas indicated above are used for the driven gear having a right-hand or clockwise helix, the formulas may be used also for the driven gear having a left-hand or counterclockwise helix, except for the reversal of the sign of the phase angle $\phi$.

$$\theta_n = \theta_{max} - \theta_{min} \quad (24)$$

$$\theta_p = 2\pi/z_2 \quad (25)$$

$$f(\theta_{min}) = \theta_s, f(\theta_{max}) = \theta_e \quad (26)$$

$$g(\theta_{min}) = \Phi_{min}, g(\theta_{max}) = \Phi_{max} \quad (27)$$

Figure 18:
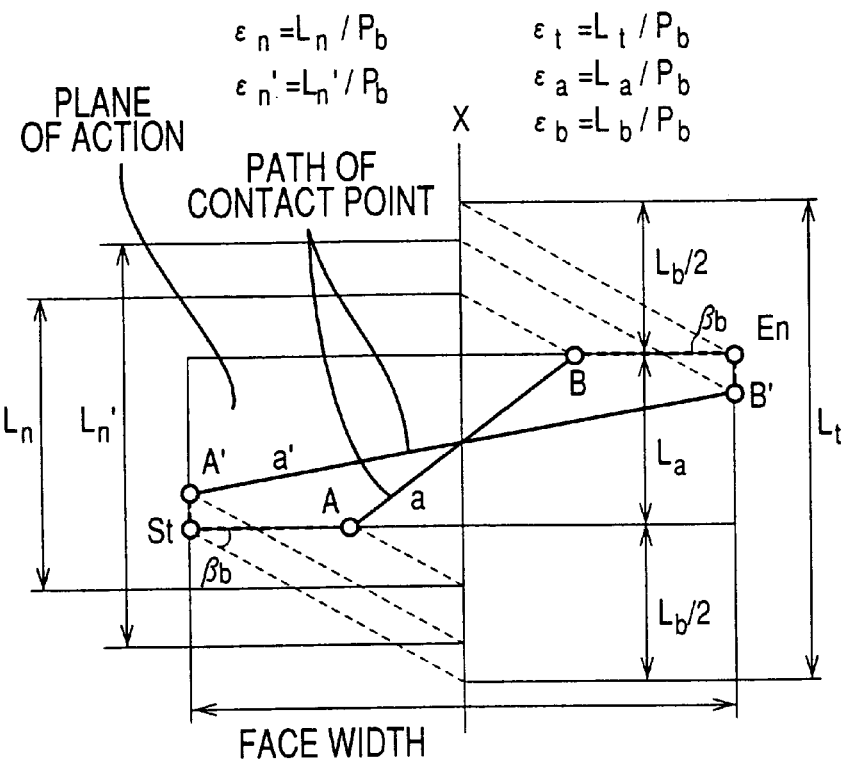
FIG. 18 is a view indicating a relationship between effective contact ratio $\epsilon_n$ and geometrical contact ratio $\epsilon_t$.

The definitions of the effective contact ratio $\epsilon_n$ and the geometrical contact ratio $\epsilon_t$ are compared with each other on a plane of action, as shown in FIG. 18. According to the definition of the effective contact ratio $\epsilon_n$, the length of contact is $L_n$ which does not include a portion of the edge contact, in the case of the path a from the start point St to the point En through the points A and B. Since the path of the contact point depends on the tooth surface modification, the effective contact ratio $\epsilon_n$ differs on the gears having the same specifications, depending upon the modified tooth surfaces. According to the definition of the geometrical contact ratio $\epsilon_t$, on the other hand, the length of contact is $L_t$ for the contact point path between the points St and En, on the assumption that the tooth profile does not have an error. Also shown in the figure are lengths $L_a$ and $L_b$ of transverse contact ratio $\epsilon_a$ and overlap contact ratio $\epsilon_b$. These lengths are also based on the assumption that the tooth profile does not have an error. In the figure, "$\beta_b$" represents a helix angle on the base cylinder, and "$P_b$" in the equations represents a base pitch on the base cylinder. Thus, the effective contact ratio $\epsilon_n$ is based on the path of the contact point, and a new index which depends on the tooth surface modification, and the specifications of the gear.

<Relationship between Contact Ratio en and Transmission Error>

Since the effective contact ratio $\epsilon_n$ depends the tooth surface modification as well as the gear specifications, there will be considered the influences of both of the gear specifications and the effective contact ratio $\epsilon_n$ on the transmission error amplitude, and the relationships between the effective contact ratio $\epsilon_n$ and the waveforms of the transmission error.

[Influences on Tooth Surface Modification]

Figure 19:
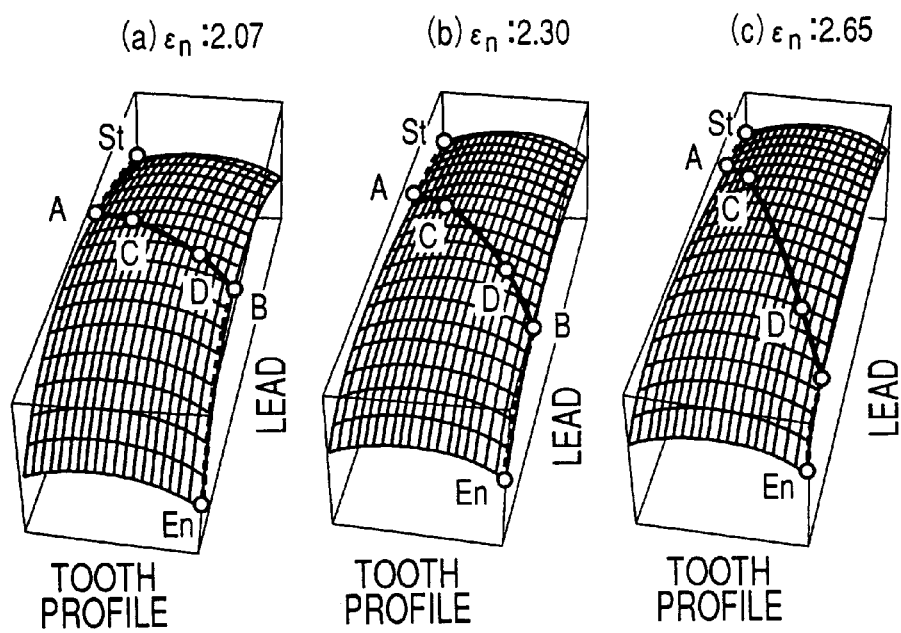
FIGS. 19 are views indicating paths of contact point corresponding to three different tooth surface modifications with different values of effective contact ratio $\epsilon_n$.

FIGS. 19 show the calculated paths of the point of tooth contact of the gear No. 1 in Table 2. Table 3 indicates the tooth surface modification amounts, and the effective contact ratio values $\epsilon_n$ calculated from these surface modification amounts. The views in FIGS. 19(a), 19(b) and 19(c) correspond to the respective tooth surface modifications a, b and c indicated in Table 3. In FIGS. 19, the tooth surface modification amounts are expressed as distances from a flat tooth surface which does not have an error. The paths of the contact point of the tooth pair from the start point St of tooth mesh to the end point $\epsilon_n$ of tooth mesh are shown in the figures. Solid lines indicate the portion of each path in which the contact point lies on the tooth surface, while broken lines indicate the portions of each path in which the edge contact takes place. Points C and D define a region in which the contact contact of the tooth pair takes place under the non-load condition The tooth profile modification and crowning amounts are determined so that the modified tooth surfaces have the same amplitude of transmission error under the non-load condition It will be understood from FIGS. 19 that the gear pair having the tooth surface modification c with the largest profile modification amount and the smallest crowning amount has the longest contact point path in the direction of the tooth lead, and the highest (largest) effective contact ratio $\epsilon_n$.

TABLE 2

|  | NO. 1 | NO. 2 | NO. 3 |
| --- | --- | --- | --- |
| Number of teeth | 29 | 29 | 29 |
| Center distance | 66.1 | 61.6 | 63.5 |
| Normal module | 2.03 | 2.03 | 2.03 |
| Normal pressure angle | 18.0 | 18.0 | 18.0 |
| Helix angle | 27.0 | 17.0 | 22.0 |
| Tooth depth | 5.6 | 5.6 | 5.6 |
| Face width | 18.0 | 18.0 | 18.0 |
| Base circle diameter | 62.1 | 58.3 | 59.9 |
| Transverse contact ratio | 1.78 | 1.95 | 1.87 |
| Overlap contact ratio | 1.28 | 0.83 | 1.06 |
| Gear ratio | 1.0 | 1.0 | 1.0 |

TABLE 3

|  | a | b | c | d |
| --- | --- | --- | --- | --- |
| Profile modification $\mu$m | 5.0 | 5.7 | 6.5 | 6.0 |
| Crowning $\mu$m | 10.0 | 6.0 | 4.0 | 5.0 |
| $\epsilon_n$ | 2.07 | 2.30 | 2.65 | 2.43 |

Figure 20:
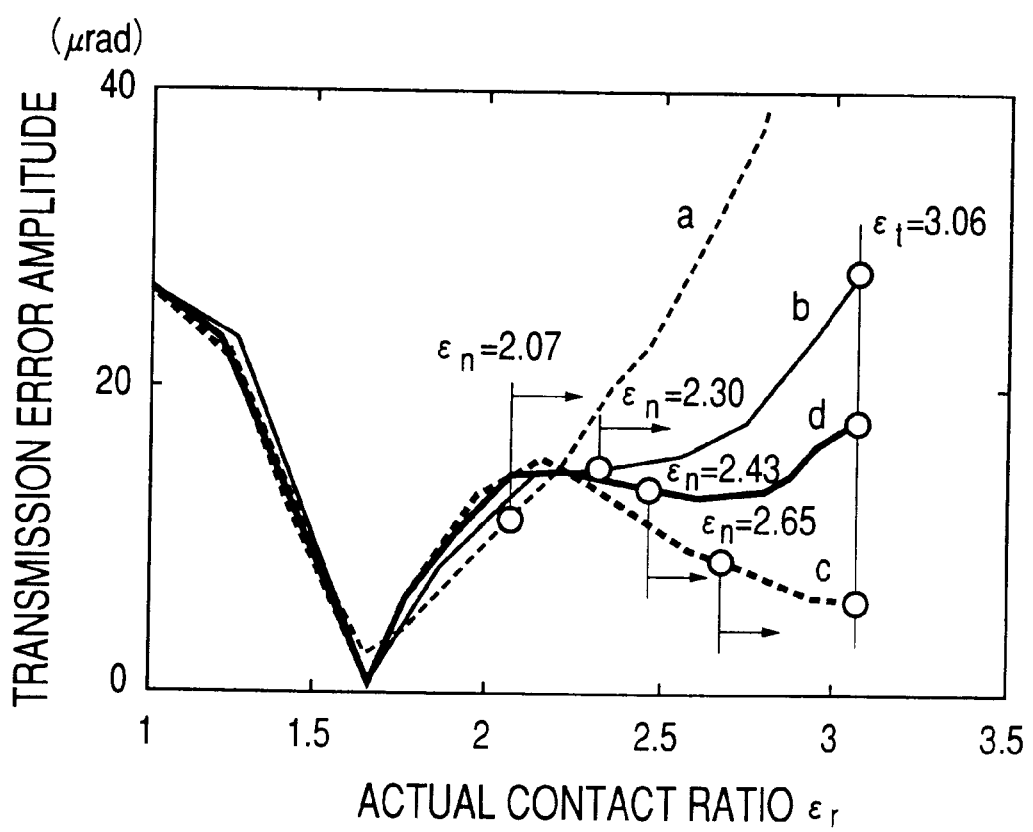
FIG. 20 is a view indicating relationships between transmission error amplitude and actual contact ratio $\epsilon_r$ corresponding to four tooth surface modifications a–d indicated in Table 3.

FIG. 20 shows the first-order components of the transmission error amplitudes of four gear pairs consisting of the three gear pairs of FIGS. 19 and another gear pair indicated at d in Table 3. The actual contact ratio $\epsilon_n$ is taken along the abscissa, and "o" marks indicate the points at which the actual contact ratio $\epsilon_r$ that increases with the load coincides with the effective contact ratio $\epsilon_n$ and the geometrical contact ratio $\epsilon_t$. The profile modification and crowning amounts are determined so that the the modified tooth surfaces have the same amplitude of transmission error under the non-load condition Therefore, although there does not exist a significant difference in a region in which the actual contact ratio $\epsilon_r$ is low, the transmission error amplitudes of the gear pairs decrease with an increase in the effective contact ratio $\epsilon_n$, in a region of the actual contact ratio $\epsilon_r$ exceeding 2.0.

It will be understood that a change in the contact point path by the tooth surface modification will cause a change in the effective contact ratio $\epsilon_n$ and a change in the loaded transmission error amplitude, even when the gear pair has the same specifications.

[Influences of Gear Specifications]

Figure 21:
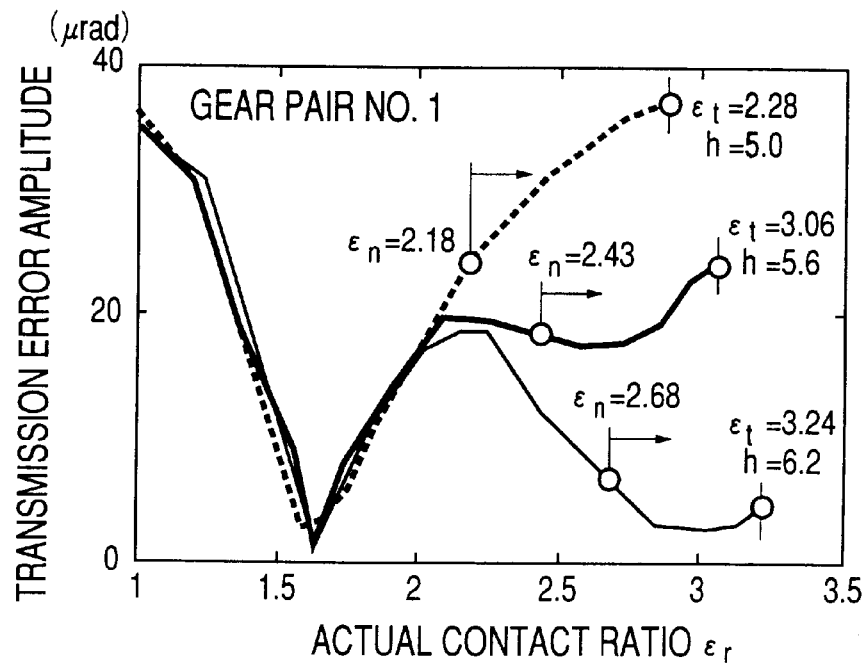
FIGS. 21 are views indicating relationships between transmission error amplitude and actual contact ratio $\epsilon_r$, of a plurality of gear pairs having different dimensions.
Figure 21:
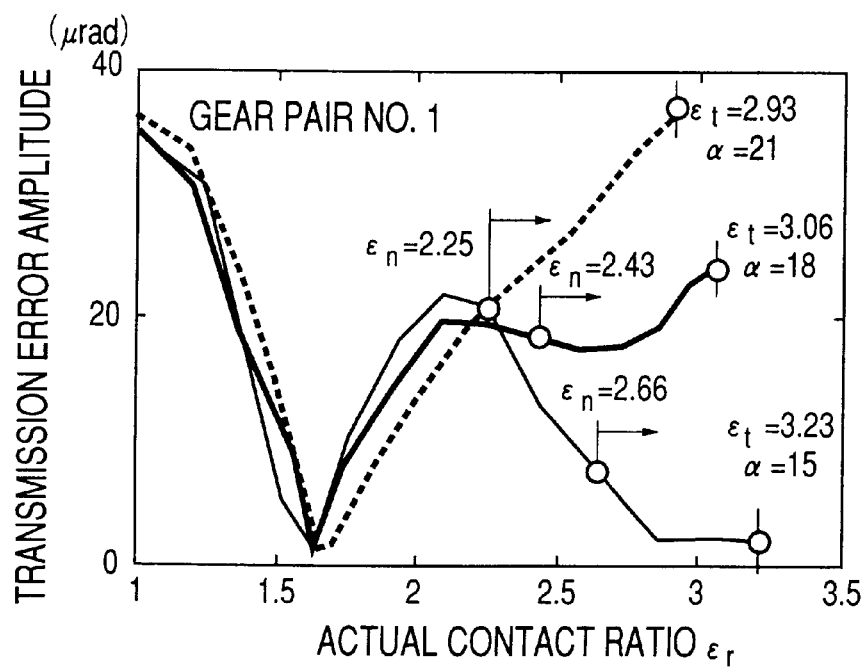
Figure 22:
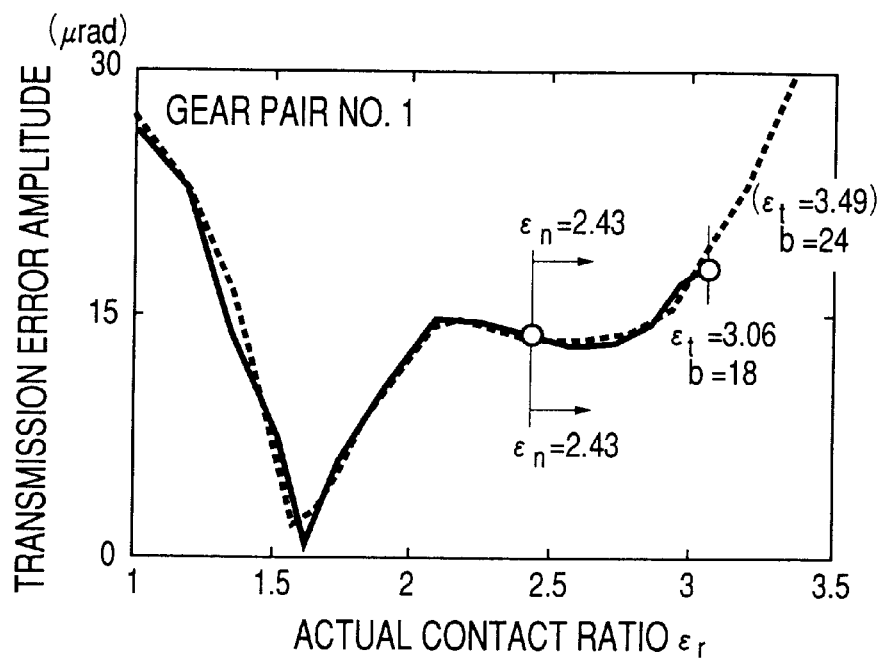
FIGS. 22 are views indicating relationships between transmission error amplitude and actual contact ratio $\epsilon_r$, of other gear pairs having different specifications.
Figure 22:
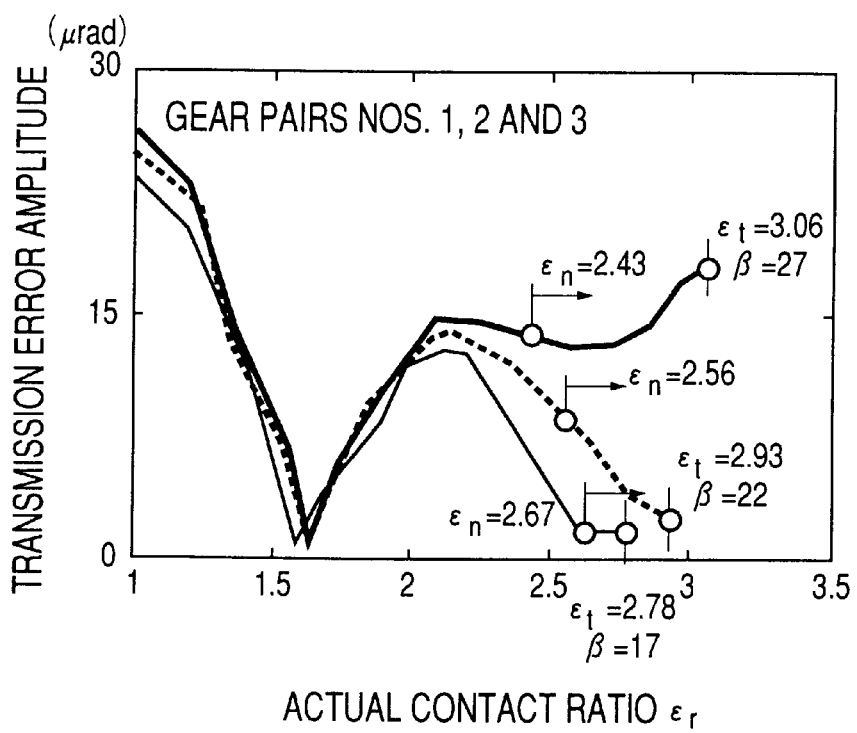

FIGS. 21 and 22 show the first-order components of the transmission error amplitudes of the gear pairs having different specifications. To evaluate the influences of the gear specifications, the gear pairs have the same profile modification and crowning coefficients of $d_0$ and $c_0$, and no pressure angle error and helix angle error. FIG. 21(a) is for comparing the pair of the gears No. 1 (having the tooth depth h of 5.6 mm) in Table 2 with pairs of gears which are identical with the gears No. 1 in Table 2 except in that the tooth depth h is changed to 5.0 mm and 6.2 mm, respectively. It will be understood from FIG. 21(a) that there arises a difference in the transmission error amplitude in a region of the actual contact ratio $\epsilon_r$ exceeding 2.0, as in the case of FIG. 20. This difference is remarkable after the actual contact ratio $\epsilon_r$ has reached a value close to the effective contact ratio $\epsilon_n$. Therefore, it will be understood that the critical point exists at a load value at which the actual and effective contact ratios $\epsilon_r$ and $\epsilon_n$ coincide with each other. It is also noted that the amplitude of the transmission error decreases with an increase in the effective contact ratio $\epsilon_n$ of the gear pairs. FIG. 21(b) is for comparing the pair of the gears No. 1 (having the pressure angle α of 18°) in Table 2 with pairs of gears which are identical with the gears No. 1 in Table 2 except in that the pressure angle is changed to 21° and 15°, respectively. Tendencies as described above are confirmed for the gear pairs having the different pressure angles α.

In the cases of FIGS. 21(a) and 21(b), the gear pairs having high values of the geometrical contact ratio εt have also high values of the effective contact ratio $\epsilon_n$, so that both of the geometrical contact ratio εt and the effective contact ratio $\epsilon_n$ cause a change in the transmission error amplitude. In the cases of FIGS. 22, however, the geometrical contact ratio $\epsilon_t$ does not influence the transmission error amplitude. FIG. 22(a) is for comparing the pair of the gears No. 1 (having the face width b of 18 mm) in Table 2 with a pair of gears which is identical with the pair of the gears No. 1 except in that the face width b is changed to 24 mm. These pairs of gears have the same profile modification and crowning coefficients $d_0$ and $c_0$, so that the gear pairs have the same effective contact ratio $\epsilon_n$. Despite a difference of about 15% in the geometrical contact ratio $\epsilon_t$ between the two gear pairs, there does not exist a significant difference in the transmission error amplitude. In the case of FIG. 22(b), the transmission error is influenced by the effective contact ratio $\epsilon_n$ but is not influenced by the geometrical contact ratio $\epsilon_r$. FIG. 22(b) is for comparing the pair of the gears No. 1 in Table 2 with pairs of gears Nos. 2 and 3 which have the same tooth number and module as the pair of the gears No. 1 but have different helix angles. There is a relationship that the loaded transmission error amplitude decreases with an increase in the effective contact ratio $\epsilon_n$, despite a relatively low value of the geometrical contact ratio $\epsilon_t$. In the cases of FIGS. 21(a) and 22(a) in which the gear pairs having different tooth depth values h and different face width values b are compared with each other, the gear pairs have the same tooth profile modification and crowning coefficients, whereby there exists a significant difference in the transmission error amplitude in the region in which the actual contact ratio $\epsilon_r$ is low. A difference in this region shown in FIGS. 21(a) and 22(a) is derived from different increments of the load and angular pitch used in the calculation In the cases of FIGS. 21(b) and 22(b) in which the gear pairs have different pressure angle values α and different helix angle values β, the gear pairs have different values of the pressure angle normal to the axis, and different base circle diameters, so that there exists a difference in the transmission error amplitude in the above-indicated region.

Since the effective contact ratio $\epsilon_n$ depends on the calculation accuracy of the tooth deflection, it is not possible to exactly determine the upper limit of the effective contact ratio. Nevertheless, the upper limit can be determined on an assumption that the transmission error amplitude does not increase in a load range in which the actual contact ratio $\epsilon_r$ exceeds 2. The analysis of the gear pairs of FIGS. 20, 21 and 22 revealed that the effective contact ratio $\epsilon_n$ has the upper limit in the neighborhood of 2.5, as indicated by thick solid lines in the figures.

[Relationships between $\epsilon_n$ and Waveforms of Transmission Error]

Figure 23:
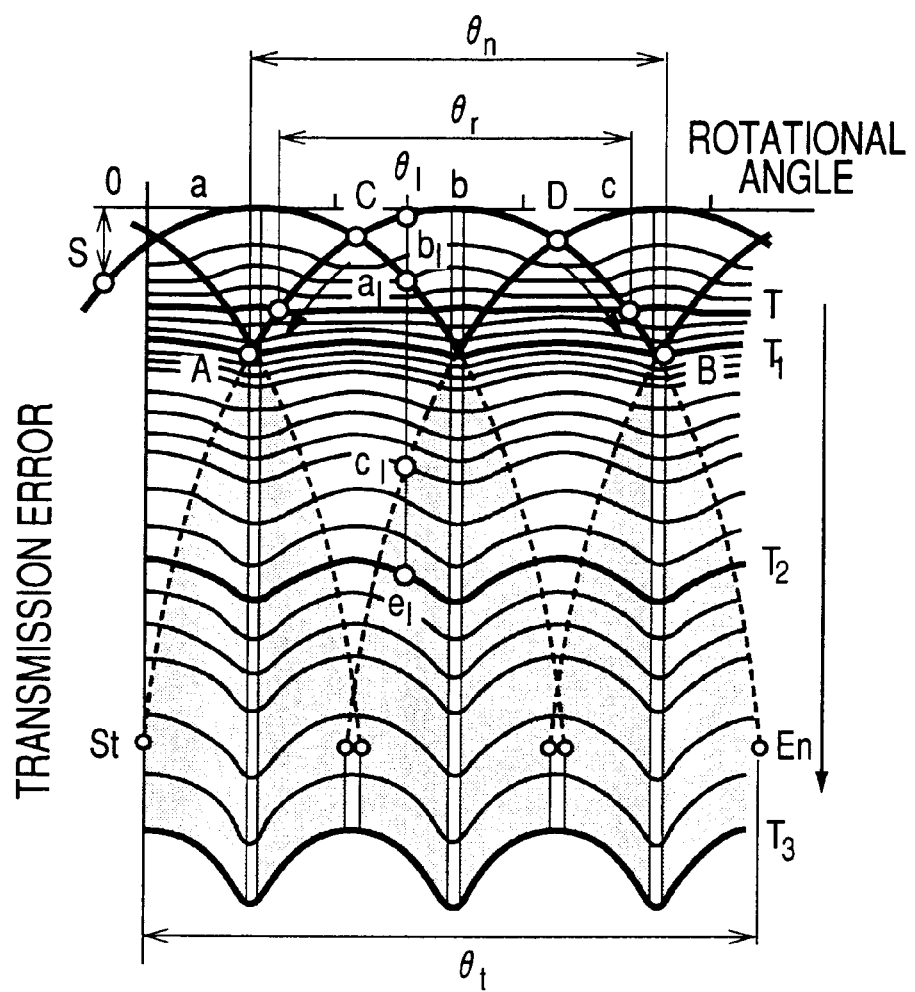
FIG. 23 is a view indicating calculated waveforms of transmission error of pair of gears No. 1 of Table 2 subjected to tooth surface modification a in Table 3.

The relationship between the effective contact ratio $\epsilon_n$ and the amplitude of the transmission error can be explained by the waveforms of the transmission error. FIG. 23 shows calculated waveforms of the transmission error of the pair of the gears No. 1 in Table 2 having the tooth surface modification a indicated in Table 3. In the figure, the rotational angle is taken along the abscissa, and there are shown waveforms of the transmission error amount calculated for each load value at each angular position, and waveforms of the tooth surface modification amount S, such that the waveforms of the transmission error amount and the tooth surface modification amount S are superimposed on each other. As the load value T increases, the angular range $\theta_r$ increases from a region between the points C and D to a region between the points A and B, and the waveform of the transmission error accordingly changes. In this load range, the waveform of the transmission error is controlled by the actual contact ratio $\epsilon_n$. At a load value $T_1$, the angular range $\theta_r$ coincides with the angular range $\theta_n$, and the actual contact ratio $\epsilon_r$ is equal to the effective contact ratio $\theta_n$, so that the waveforms of the transmission error at larger load values $T_2$ and $T_3$, for example, have the same period at the load value $T_1$, but amplitudes different from those at the load values $T_2$ and $T_3$. This is because one of the simultaneously meshing three pairs of teeth has the edge contact. At the position of the rotational angle $\theta_1$, the tooth pair c of the three pairs of teeth has the edge contact, with the relatively small load acting thereon, so that the transmission error amount $e_1$ is determined primarily by the tooth pairs a and b. Accordingly, the waveform of the transmission error has the sane period as i the case of the load value $T_1$ at which the load is shared by the tooth pairs a and b. This condition is established in a shaded area in FIG. 23 wherein the actual contact ratio $\epsilon_n$ exceeds the effective contact ratio $\epsilon_n$. In this load area, the waveform of the transmission error is controlled by the effective contact ratio $\epsilon_n$. This characteristic is seen with gears having different specifications and tooth surface modifications.

Figure 24:
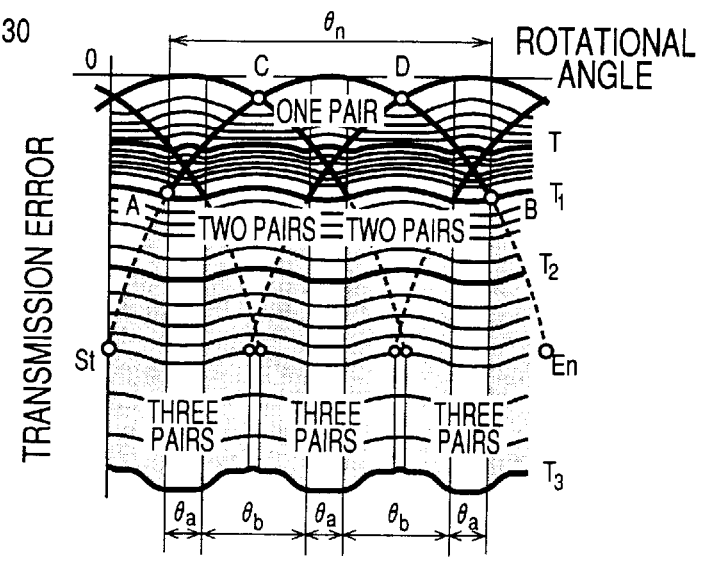
FIGS. 24 are views indicating calculated waveforms of transmission error of gear pairs subjected to three different tooth surface modifications by different values of effective contact ratio $\epsilon_n$.
Figure 24:
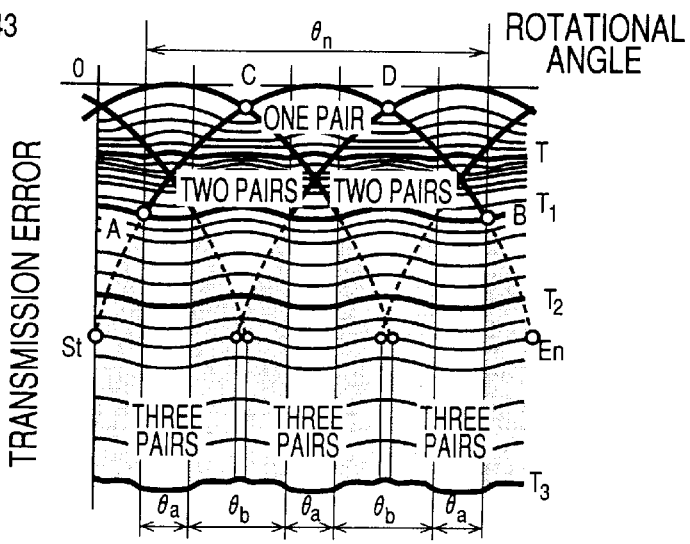
Figure 24:
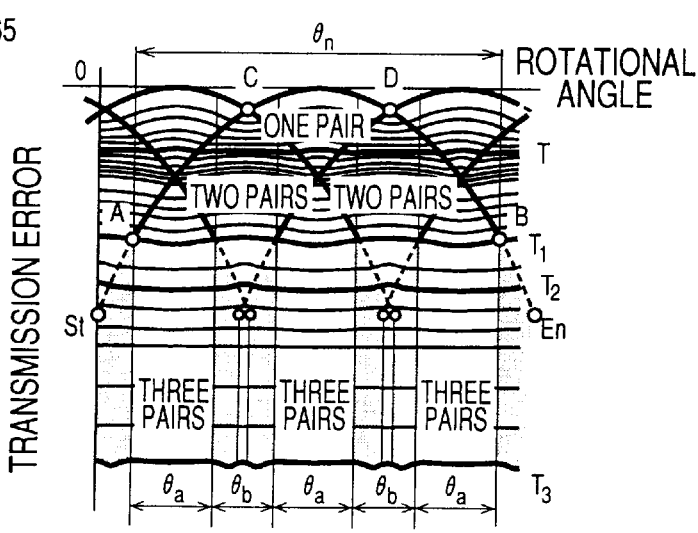

The waveform of the transmission error varies with the effective contact ratio $\epsilon_n$, as indicated in FIGS. 24, by way of example. These examples use pairs of the gears No. 1 in Table 2 which have been subjected to the tooth surface modifications b, d and c. The waveform of the transmission error of each gear pair is calculated at the same load value. It is noted that the load value $T_1$, is a value at which the actual contact ratio $\epsilon_r$ coincides with the effective contact ratio $\epsilon_n$, and which differs from one gear pair to another. The effective contact ratio $\epsilon_n$ has the lowest value of 2.07 in the case of FIG. 23, and increases in the order of the cases of FIGS. 24(a), 24(b) and 24(c). In the case of FIG. 23, the waveforms of the transmission error at the load values $T_2$ and $T_3$ have larger amplitudes than that at the load value $T_1$ at which the actual contact ratio $\epsilon_r$ is equal to the effective contact ratio $\epsilon_n$. In the case of FIG. 24(a), the amount of increase of the amplitude at the load values $T_2$ and $T_3$ is smaller. In the case of FIG. 24(b), the amplitudes are almost constant at the different load values. In the case of FIG. 24(c), the amplitude of the waveform of the transmission error tends to be smaller.

There will be considered the configuration of the waveform of the transmission error. The shaded areas in the figures are regions in which the tooth pair in question has the edge contact. The number of the tooth pairs except the tooth pair of the edge contact is equal to 3 in the angular range $\epsilon_a$, and 2 in the angular range $\theta_b$, as indicated in the figures. In the angular range $\theta_a$, the load to be transmitted is shared by the three tooth pairs, and the transmission error amount is averaged and has a smooth waveform and a small amount of change with the load. The amplitude and the amount of change with the load at the load value $T_1$ decrease with an increase in the angular range $\theta_a$. Since the angular range $\theta_a$ increases with an increase in the effective contact ratio $\epsilon_n$, the amplitude and the amount of change with the load decrease with the effective contact ratio $\epsilon_n$.

In summary, the waveform of the transmission error has different characteristics on the opposite sides of a critical point of the load value acting on the tooth pair in question, which critical point is a point at which the angular ranges $\theta_r$ and $\theta_n$ coincide with each other, that is, the actual and effective contact ratios $\epsilon_r$ and $\epsilon_n$ coincide with each other. It was found that the waveform depends on the actual contact ratio $\epsilon_r$ when the actual contact ratio $\epsilon_r$ is lower (smaller) than the effective contact ratio $\epsilon_n$, and depends on the effective contact ratio $\epsilon_n$ when the actual contact ratio $\epsilon_r$ exceeds the effective contact ratio $\epsilon_n$, and that the amplitude of the transmission error and the amount of change with the load decrease with an increase in the effective contact ratio $\epsilon_n$.

Where the tooth surface modification of the gear remains unchanged, the effective contact ratio $\epsilon_n$ is determined by the specifications of the gears. Therefore, it will be understood that the transmission error is influenced by the gear specifications in the load range in which the actual contact ratio $\epsilon_r$ exceeds the effective contact ratio $\epsilon_n$, and that the amount of the influence is small in the small-load range.

<Gear Designing Using $\epsilon_n$ as Index>

In view of the above analysis, the specifications of a gear can be determined using the effective contact ratio $\epsilon_n$ as an index, so that the gear has a reduced transmission error. However, since the effective contact ratio $\epsilon_n$ depends also on the tooth profile, it is necessary to take the desired tooth surface modification into account. JP-A-8-197332 discloses a method of establishing optimum tooth surface modification by using the non-load transmission error as an index. The amount of the tooth surface modification according to this method is the smallest amount required under the condition that the tooth pairs do not suffer from the edge contact on the tooth top or at the ends of the face width even in the presence of some axial misalignment of the gear in question This method makes it possible to determine the tooth surface modification and the specifications of the gear, using the effective contact ratio $\epsilon_n$ as the index, for designing the gear with the reduced loaded transmission error.

Figure 25:
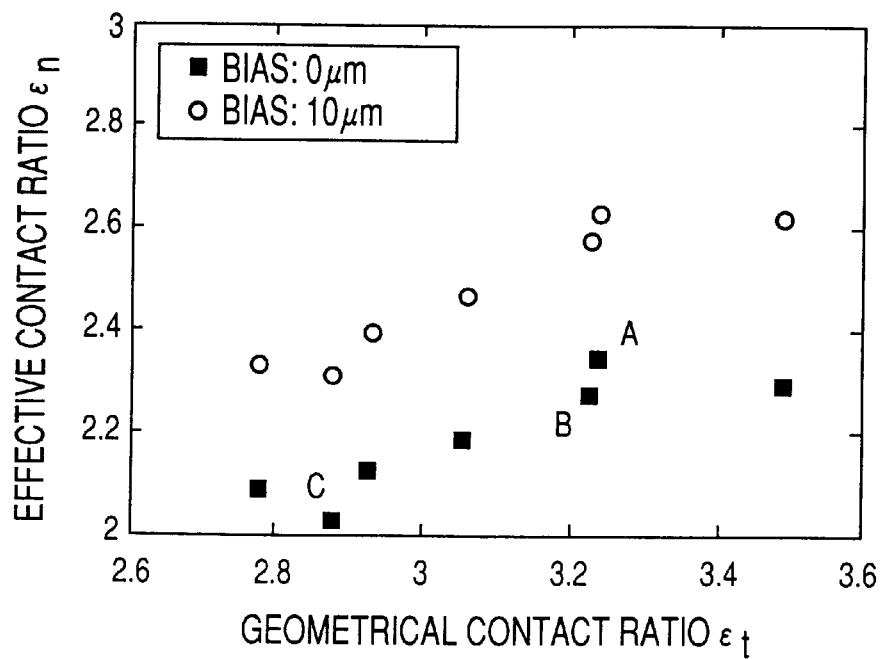
FIG. 25 is a view indicating relationships between. effective contact ratio $\epsilon_n$ and geometrical contact ratio $\epsilon_t$, of gear pairs of FIGS. 21 and 22 subjected tooth surface modifications.

When the gear has the smallest required amount of tooth surface modification, there exist substantive mutual dependence between the effective contact ratio $\epsilon_n$ and the geometrical contact ratio $\epsilon_t$, so that the gear may have a high value of the effective contact ratio $\epsilon_n$, by determining the specifications of the gear so as to have a high value of the geometrical contact ratio $\epsilon_t$. FIG. 25 shows relationships between the geometrical contact ratio $\epsilon_t$ and the effective contact ratio $\epsilon_r$ when the tooth surface modifications are determined for the gear pairs of FIGS. 21 and 22 where these gear pairs have misalignments in the form of parallelism error of 0.01rad and torsional error of 0.1rad. The relationships shown in the figure include the relationship indicated by "o" marks, which was obtained by biased modification of the tooth profile. It will be understood from the figure that the geometrical and effective contact ratios $\epsilon_t$, $\epsilon_n$ tend to change together substantially linearly. Conventional reduction in the vibration level of gears having high geometrical contact ratio values $\epsilon_t$ may be considered to be attributable to an increase in the effective contact ratio $\epsilon_n$ by specific tuning of the tooth profiles. It is noted, however, that the gear pairs may different effective contact ratio values $\epsilon_n$ even where the gear pairs have almost the same geometrical contact ratio value $\epsilon_t$, as indicated A and B in FIG. 25, and that the effective contact ratio $\epsilon_n$ may decrease even with an increase in the geometrical contact ratio $\epsilon_t$, as indicated at C in the figure. In this sense, the use of the effective contact ratio $\epsilon_n$ as an index is required to design the gears with higher reliability.

Figure 26:
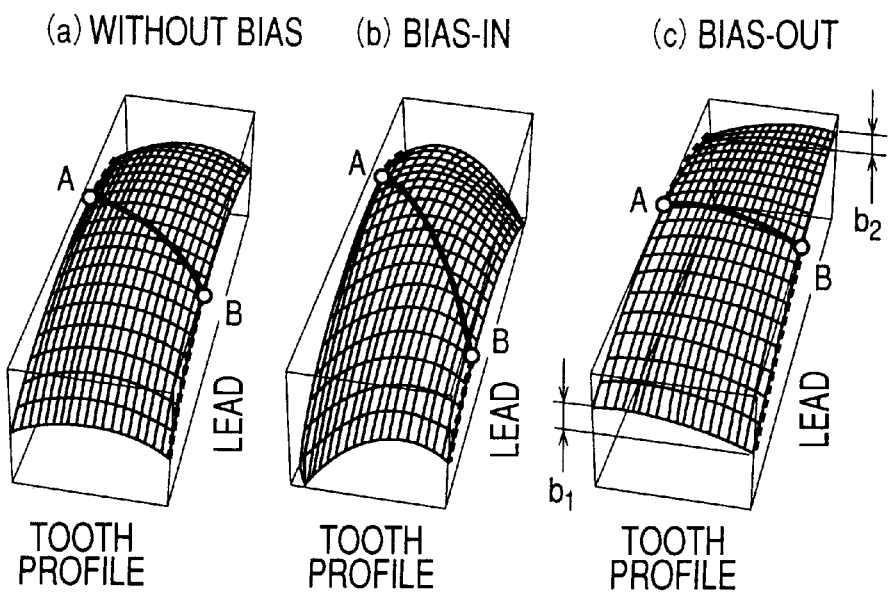
FIGS. 26 are views for explaining a change in path of contact point by biased tooth surface modifications.

The method of designing the gears with high effective contact ratio $\epsilon_n$ by suitably determining the gear specifications is in most cases subject to restrictions by the space within a speed reducing gear device or required strength of the gears, and does not necessarily assure a high degree of freedom in designing of the gears. In such cases, it is considered to adjust the path of the contact point depending upon the tooth profile. Even where the profile modification amount and the crowning amount are determined by the amount of misalignment, biased modification of the tooth surface makes it possible to increase the length of the contact point path in the direction of the tooth lead, for thereby increasing the effective contact ratio $\epsilon_n$. The biased modification gives pressure angle errors in the opposite directions at the opposite ends of the face width of the tooth. FIGS. 26 show relationships between the tooth profile and the contact point path, in the case where the tooth surface modification does not have a bias, in the case where the tooth surface modification is biased so that the contact point path is inclined toward the diagonal line, namely, in a "bias-in" direction, and in the case where the tooth surface modification is biased so that the contact point path is inclined in a "bias-out" direction opposite to the "bias-in" direction The amount of the bias is a sum of pressure angle errors ($b_1+b_2$) at the opposite ends of the face width, and the coefficient $b_0$ of the biased modification used in the formula (4), etc. represents an inclination, which is a bias amount changing along the tooth lead, as expressed by a straight line. It will be understood from FIG. 26 that the biased modification in the bias-in direction results in an increase in the length of the contact point path in the direction of the tooth lead, and a consequent increase in the effective contact ratio $\epsilon_n$.

Figure 27:
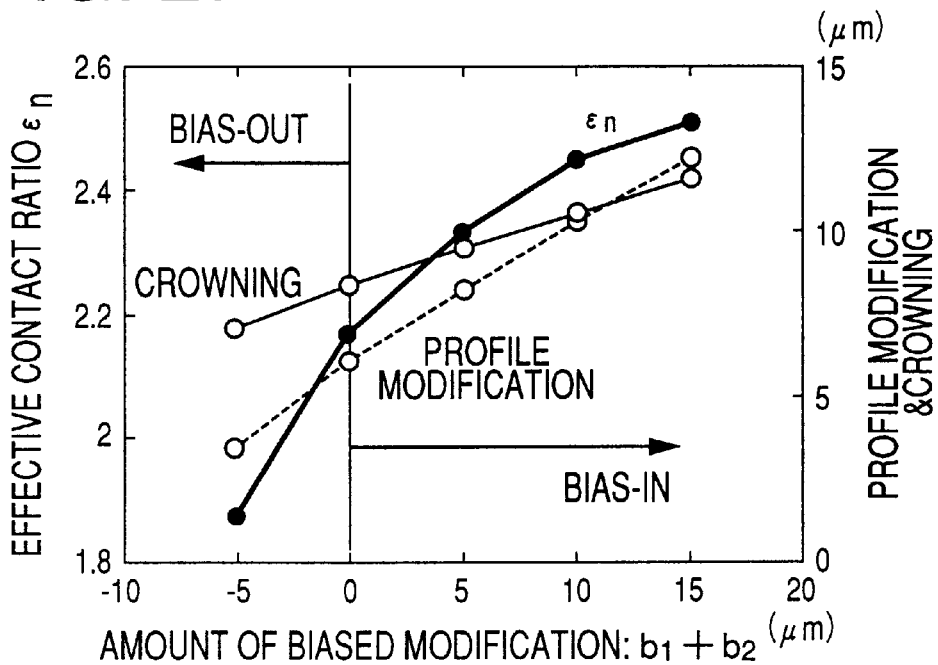
FIG. 27 is a view indicating a relationship among amount of biased modification, smallest profile modification and crowning amounts required for accommodating axial misalignment, and effective contact ratio $\epsilon_n$, in the case of a pair of gears No. 1 in Table 2.

To modify the tooth surface, the amount of bias of the tooth surface modification is determined, and then the optimum amounts of the profile modification and crowning are determined. FIG. 27 shows a relationship among an amount of biased tooth surface modification of the pair of the gears No. 1 in Table 2, smallest amounts of tooth profile modification and crowning required for accommodating axial misalignment of the gear pair, and the effective contact ratio $\epsilon_n$ of the gear pair. The axial misalignment consists of parallelism error of 0.01rad and torsional error of 0.01rad. The smallest amounts of profile modification and crowning required to accommodate the axial misalignment. Solid and broken lines indicate these required smallest amounts, respectively, while thick solid line indicates the effective contact ratio $\epsilon_n$. The amount of the biased modification is positive in the bias-in direction It will be understood from FIG. 27 that the effective contact ratio $\epsilon_n$, which is about 2.2 when the tooth surface modification is not biased, is about 2.5 when the modification is biased by an amount of 15$\mu$m in the bias-in direction The above analysis has provided the following findings relating to the designing of gears:

(i) The amplitude of the transmission error has maximal and minimal points when the actual contact ratio $\epsilon_r$ is equal or close to integers, where the specifications of the gear in question remain unchanged and the tooth surfaces are not modified. The maximal value of the amplitude is the largest under the non-load condition Accordingly, the gear having a relatively small amplitude of non-load transmission error under the non-load condition has a relatively small amplitude of loaded transmission error.

(ii) In a region wherein the actual contact ratio $\epsilon_r$ exceeds the effective contact ratio $\epsilon_n$, the amplitude of the transmission error decreases with an increase in the effective contact ratio $\epsilon_n$, and the effective contact ratio $\epsilon_n$ of the gear can be increased by suitably determining the specifications of the gear and the tooth surface modification.

Therefore, it is possible to design a gear with a reduced amplitude of transmission error over a wide load range, by determining the specifications and tooth surface modification of the gear, using the non-load transmission error amplitude and the effective contact ratio $\epsilon_n$ as indexes for the designing.

The following conclusions have been reached as a result of studying the relationship between the transmission error and the effective contact ratio $\epsilon_n$ which is defined in view of the influences of the geometrical contact ratio $\epsilon_t$ and the tooth surface modification:

(i) The loaded transmission error must be considered in two load ranges, based on the relationship between the actual and effective contact ratios $\epsilon_r$ and $\epsilon_n$.

(ii) In the load range in which the actual contact ratio $\epsilon_r$ exceeds the effective contact ratio $\epsilon_n$, the amplitude of the transmission error is controlled by the effective contact ratio $\epsilon_n$, and decreases with an increase in the effective contact ratio $\epsilon_n$. Therefore, a gear with a reduced noise can be efficiently and easily designed, without having to effect simulations or tests. In particular, an increase in the loaded transmission error can be prevented, and the gear noise can be effectively reduced, when the effective contact ratio $\epsilon_n$ is increased to about 2.4 or higher, preferably to about 2.5 or higher.

(iii) In a small-load range in which the actual contact ratio $\epsilon_r$ is lower than the effective contact ratio $\epsilon_n$, the transmission error does not depends upon the effective contact ratio $\epsilon_n$, and is predominantly controlled by the tooth profile.

(iv) Where the the tooth surface modification of the gear remains unchanged, the effective contact ratio $\epsilon_n$ is determined by the specifications of the gears. Therefore, the transmission error is influenced by the gear specifications in the load range in which the actual contact ratio $\epsilon_r$ exceeds the effective contact ratio $\epsilon_n$, and that the amount of the influence is small in the small-load range.

(v) The effective contact ratio $\epsilon_n$ of the gear can be increased by determining the gear specifications so as to give a relatively high geometrical contact ratio $\epsilon_t$, and giving a biased modification to the tooth surface.

(vi) By using the non-load transmission error amplitude and effective contact ratio $\epsilon_n$, it is possible to design a gear which has a reduced transmission error amplitude over a wide load range.

<Influences of Tooth Surface Modification on Transmission Error>

Figure 28:
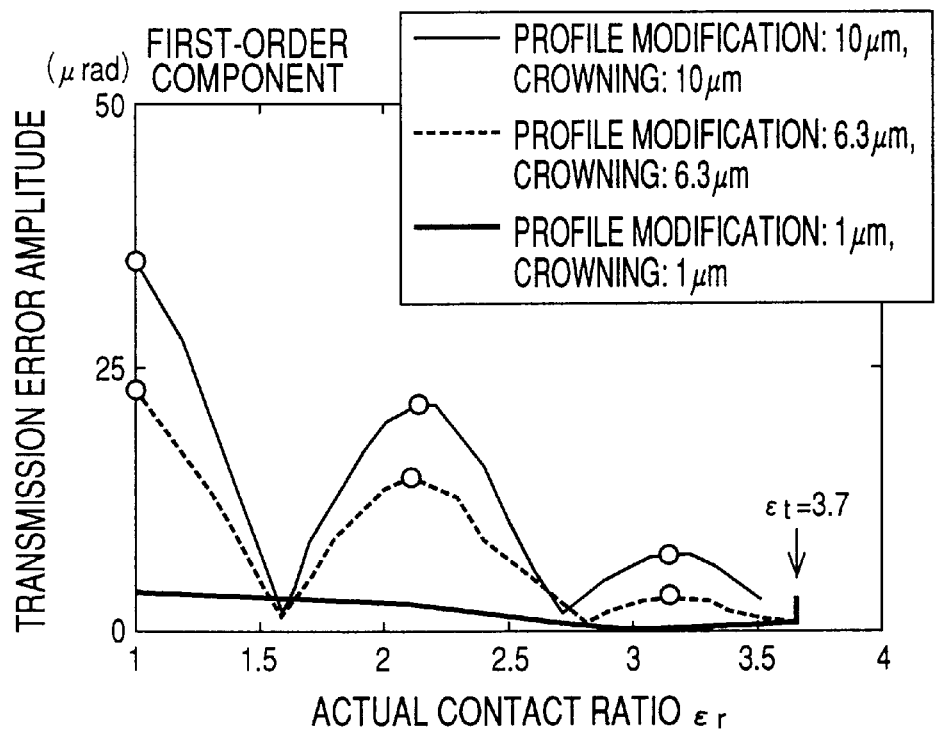
FIG. 28 is a view indicating calculated first-order component of transmission error amplitudes of respective pairs of gears No. 1 in Table 4, which correspond to different amounts of profile modification and crowning.

JP-A-8-197332 discloses that the transmission error of a gear pair decreases with a decrease in the amount of tooth surface modification, if each gear tooth is a rigid body. Here, deflection of the gear due to a load is analyzed. FIG. 28 shows calculated first-order component of the transmission error amplitudes of respective pairs of gears No. 1 in Table 4, whose geometric contact ratio $\epsilon_t$ is high enough to minimize the influence of the gear specifications. The gear pairs have different amounts of tooth profile modification and crowning. The calculation is effected over the same load range and with the same increment of the load value, for all of the gear pairs. the load In the figure, the actual contact ratio $\epsilon_r$ corresponding to each load value is taken along the abscissa. It will be understood that the maximal values of the transmission error decrease with a decrease in the tooth surface modification amount. For instance, the maximal values of the gear pair whose profile modification and crowing amounts are 6.3μm are smaller than those of the gear pair whose profile modification and crowing amounts are 10μm. The maximal values include the maximal value under the non-load condition in which the actual contact ratio $\epsilon_r$ is equal to 1.0. With the same gear specifications, the transmission error decreases with a decrease in the tooth surface modification amount, even where the deflection due to a load is taken into account. In the case of the gear pair whose profile modification and crowning amounts are 1μ and which has almost no tooth surface error, the transmission error amplitude is generally small. With the same load value, however, the amplitude become larger when the actual contact ratio $\epsilon_r$ becomes higher than the geometrical contact ratio $\epsilon_t$. Actually, the gear pair has some amount of axial misalignment and requires a suitable amount of tooth profile modification for accommodating the misalignment. To minimize the transmission error amplitude in this case, however, it is effective to minimize the tooth surface modification amount.

TABLE 4

|  | NO. 1 | NO. 2 |
| --- | --- | --- |
| Number of teeth | 43 | 29 |
| Center distance | 66.1 | 66.1 |
| Normal module | 1.37 | 2.03 |
| Normal pressure angle | 18.0 | 18.0 |
| Helix angle | 27.0 | 27.0 |
| Tooth depth | 3.8 | 5.6 |
| Face width | 18.0 | 18.0 |
| Pitch circle diameter | 66.1 | 66.1 |
| Base circle diameter | 62.1 | 62.1 |
| Tooth lead | 407.4 | 407.4 |
| Transverse contact ratio | 1.79 | 1.78 |
| Overlap contact ratio | 1.90 | 1.28 |

<Partial Contact due to Pressure Angle Error and Helix Angle Error>

The transmission error increases when a tooth pair has an edge or partial contact on the tooth top or at the ends of the face width due to axial misalignment of the gear. Here, the partial contact will be considered together with the tooth deflection due to a load.

Figure 29:
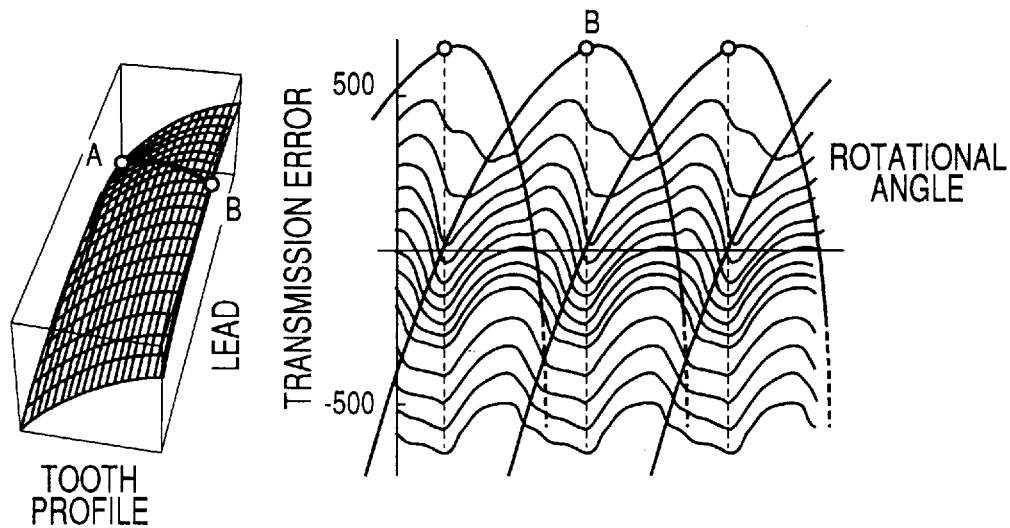
FIG. 29 is a view indicating measured paths of contact point and waveforms of transmission error, where gear pair No. 1 in Table 4 is given pressure angle error of 60μm and crowning of 10μm.
Figure 30:
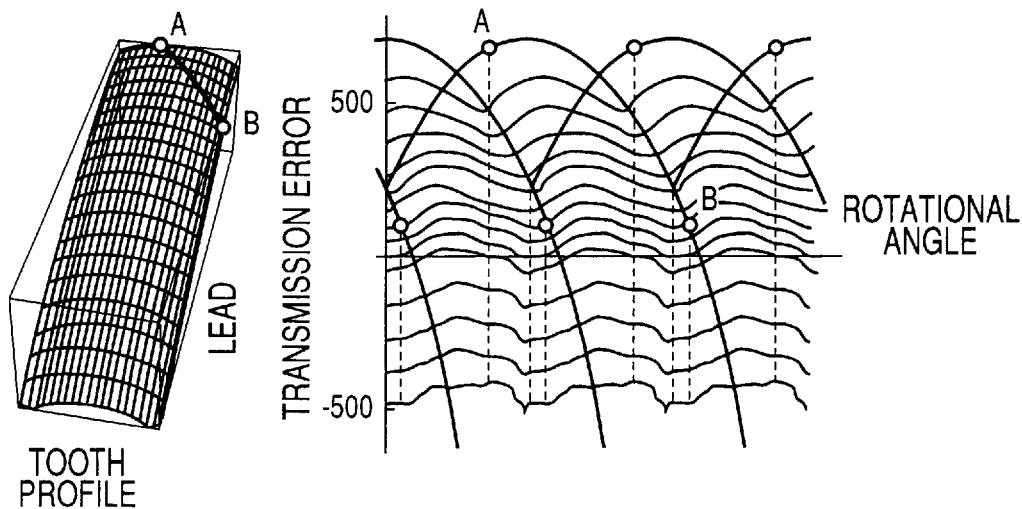
FIG. 30 is a view indicating measured loci of contact point and waveforms of transmission error, where gear pair No. 1 in Table 4 is given helix angle error of 60μm and crowning of 10μm.

For example, the partial contact occurs on a pair of gears No. 1 in Table 4, which has a pressure angle error of 60μm and a helix angle error of 60μm due to an excessively large amount of axial misalignment. In this example, each tooth surface has a profile modification amount of 10μm and a crowning amount of 10μm. FIGS. 29 and 30 show paths of contact point on the modified tooth surface and calculated waveforms of transmission error. In the case of FIG. 29, the gear pair has a pressure angle error. In the case of FIG. 30, the gear pair has a helix angle error. A portion of the contact point path between points A and B lies on the tooth surface. When the contact point is located on the other portions of the path, the partial or edge contact takes place on the tooth top or at the ends of the face width. In the presence of the pressure angle error (in the case of FIG. 29), the amplitude of the transmission error has a sawtooth waveform, with a peak being located at the point B under the non-load condition As the load increases, the amount of deflection of the teeth increases during the edge contact, and the transmission error amplitude accordingly increases. In the presence of the helix angle error (in the case of FIG. 30), the influence of the edge contact on the transmission error amplitude is smaller than in the presence of the pressure angle error. This is because the edge contact at the end. of the face width causes a transmission error equivalent to an amount of tooth surface modification, which does not have a sawtooth waveform as in the case where the pressure angle error is present.

Figure 31:
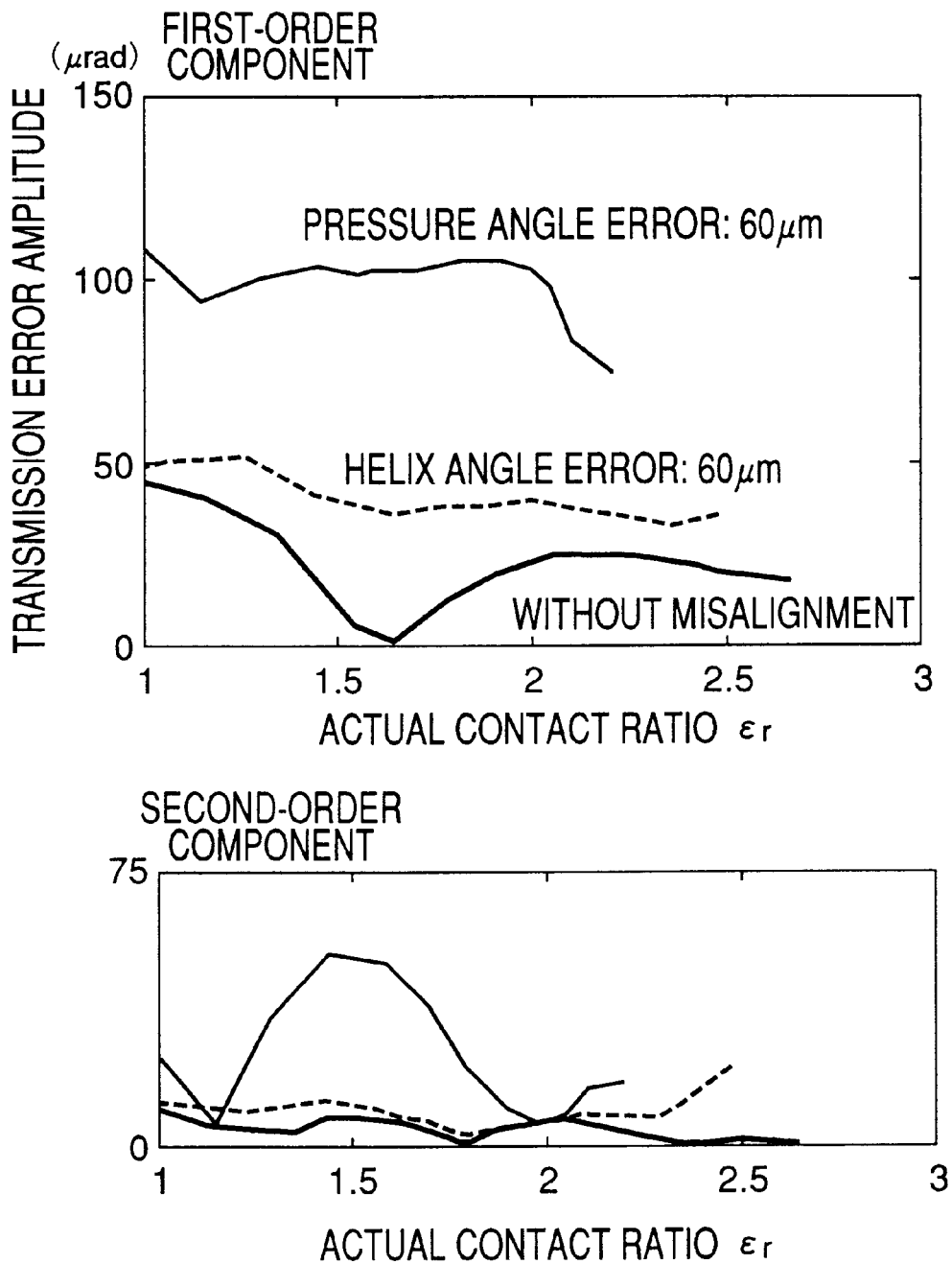
FIG. 31 is a view indicating changes of first-order and second order components of transmission error in relation to actual contact ratio εr taken along the abscissa, in the cases where pressure angle error and helix angle error exist, and in the case where no misalignment exists.

FIG. 31 shows changes of the first-order and second-order frequency components of the transmission error in relation to the actual contact ratio $\epsilon_r$ taken along the abscissa. In the presence of the pressure angle error, the first-order and second-order components are both large over the entire range of the actual contact ratio $\epsilon_r$ indicating a large influence of the edge contact. In the presence of the helix angle error, too, the transmission error tends to be large. Thus, the partial contact of the teeth at their edge will cause an increase in the amplitude of the transmission error, and the influence of the edge contact at the ends of the face width cannot be ignored. Thus, it is necessary to design the tooth profile so as to avoid the partial contact, irrespective of the load value.

<Optimization of Tooth Surface Modification>

The tooth surface must be modified so as to prevent the edge contact which arises from axial misalignment of a speed reducing gear device. To reduce the transmission error, the amount of the tooth surface modification must be minimized. In view of these requirements, the optimum amount of the tooth surface modification is the smallest amount required to prevent the edge contact. The optimum tooth surface modification permits the contact point path of a tooth pair to lie on the tooth surfaces, even in the presence of axial misalignment of the gear pair.

Figure 32:
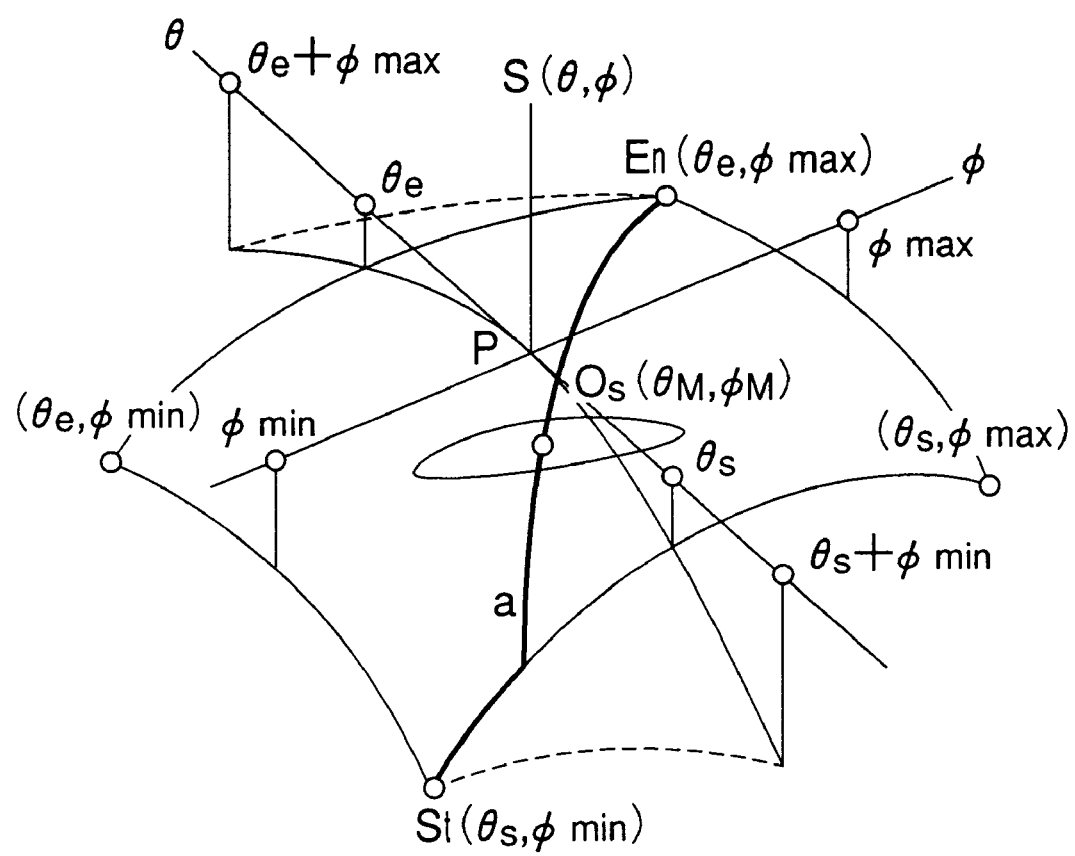
FIG. 32 is a view indicating a path of contact point which passes point En at one end of the face width on the tooth top, due to the misalignment, upon termination of meshing of the teeth.

FIG. 32 is a view indicating a path of contact point which passes point En at one end of the face width on the tooth top, due to the misalignment, upon termination of meshing of the teeth. When the contact point Os is located at the point En at the end of the tooth mesh, a condition represented by the following formula (28) is satisfied. The formula includes the tooth profile modification coefficient do and the crowning coefficient co as unknown values. These coefficients can be obtained by solving the formula, so that the optimum tooth surface modification amount is obtained. The coefficients $d_0$ and $c_0$ at the start of the tooth mesh may be similarly obtained according to the following formula (29). The larger ones of the coefficient $d_0$ and $c_0$ obtained according to the formulas (28) and (29) are used as the optimum coefficients.

$$f(\theta_e+\Phi_{max})=\theta_e, g(\theta_e+\Phi_{max})=\Phi_{max} \qquad (28)$$

$$f(\theta_s+\Phi_{min})=\theta_s, g(\theta_s+\Phi_{min})=\Phi_{min} \qquad (29)$$

Figure 33:
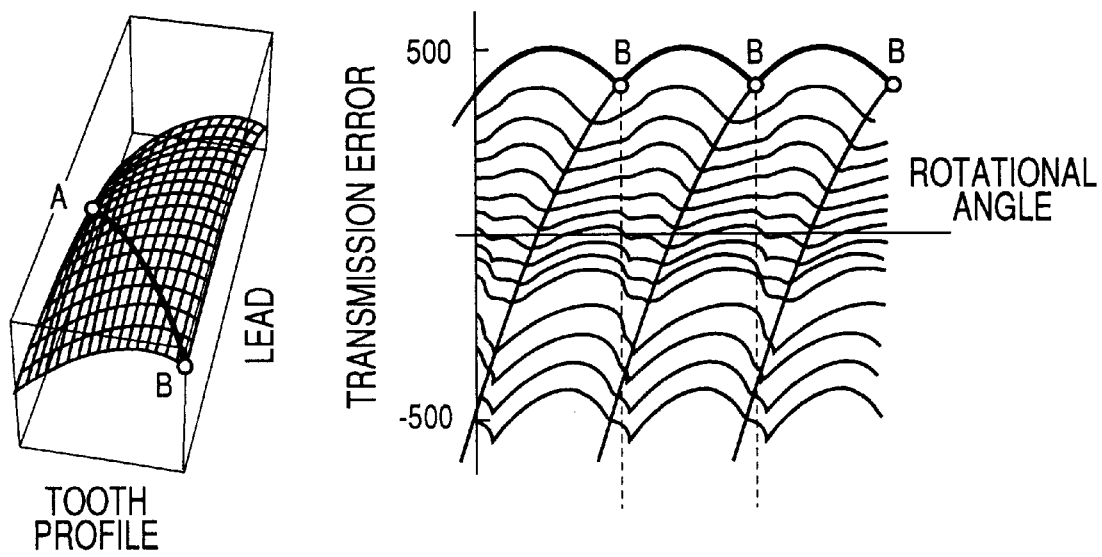
FIG. 33 is a view indicating a path of contact point and measured waveforms of transmission error, where the tooth surface modification amounts of a pair of gears No. 1 in Table 4 are optimized, in the presence of predetermined parallelism error and torsion error of the gear pair.
Figure 34:
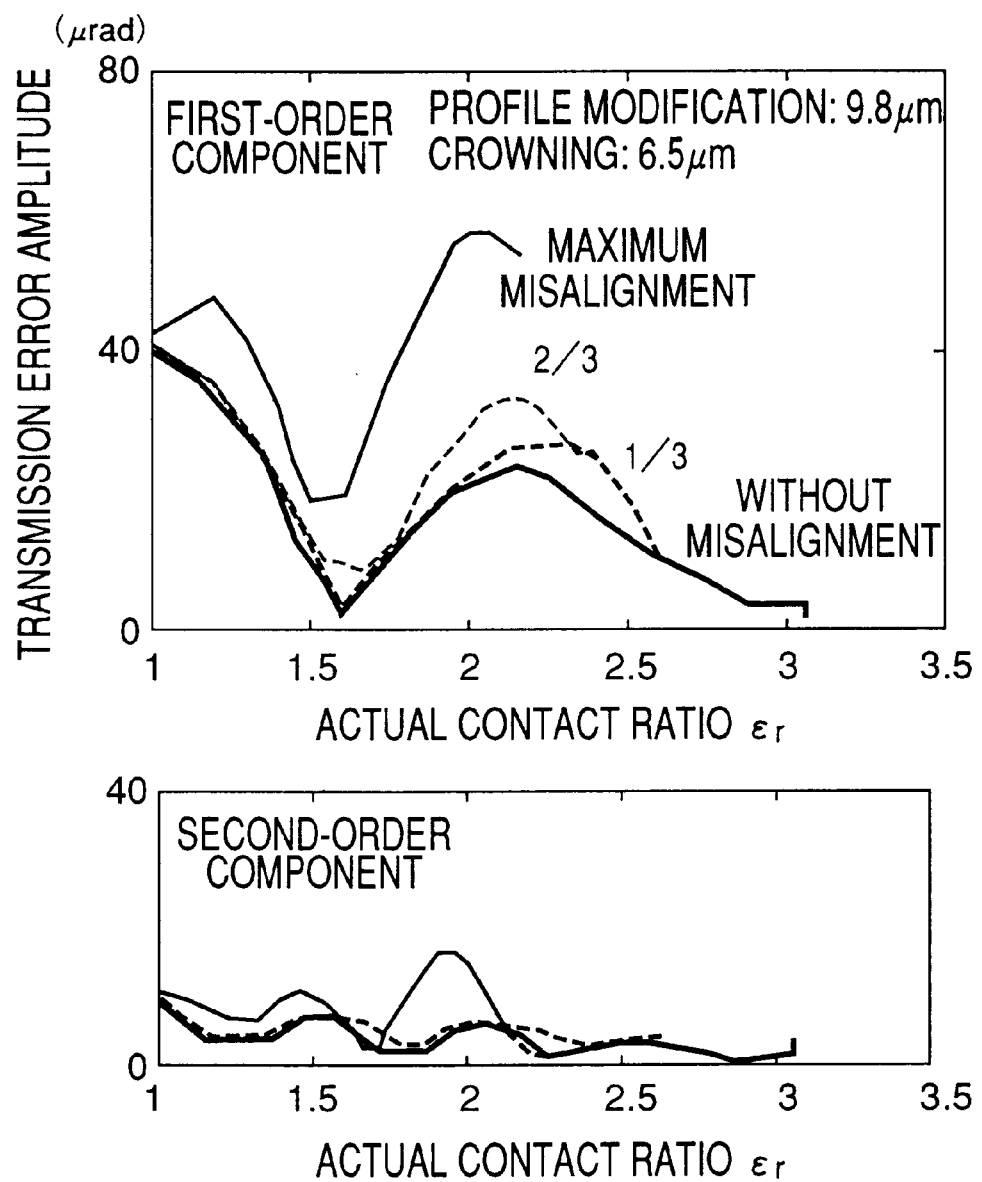
FIG. 34 is a view indicating calculated changes due to a load, of first-order and second-order components of transmission error in relation to actual contact ratio $\epsilon_r$, in the case of FIG. 33.

FIG. 33 shows optimized tooth surface modification of a pair of gears No. 1 in Table 4, which has predetermined amounts of parallelism error and torsional error. The path of the contact point passes the end of the face width on the tooth top upon termination of meshing of the tooth pair, and the tooth pair does not have an edge contact during meshing under the non-load condition, so that the transmission error amplitude will not be increased by the parallelism and torsional errors. The amount of increase in the amplitude under a load condition is small. FIG. 34 shows calculated changes due to the load, of the first-order and second-order components of the transmission error in relation to the actual contact ratio $\epsilon_r$. The figure also shows the changes of the transmission error where the parallelism and torsional error amounts are reduced to ⅓ and ⅔ of the predetermined amounts. In the presence of the predetermined amounts of parallelism and torsional errors, the maximal values of the transmission error which appear in the neighborhood of the actual contact ratio $\epsilon_r$ of 2 is considerably large. In the presence of the ⅓ and ⅔ error amounts, the maximal values of both of the first-order and second-order components of the transmission error are reduced.

<Optimization of Gear Specifications>

In the load range wherein the actual contact ratio $\epsilon_r$ exceeds the effective contact ratio $\epsilon_n$, the transmission error is controlled by the effective contact ratio $\epsilon_n$ which is determined by the gear specifications and the tooth surface modification Further, the amount of the tooth surface modification is optimized with respect to the gear specifications and the axial misalignment amount. Therefore, the transmission error of the gear can be reduced by determining the gear specifications so as to minimize the optimum tooth surface modification amount. Since the angular pitch functions as a factor determining the amplitude of the transmission error, the gear specifications must be optimized while taking into account the influence of the angular pitch.

<Influence of Gear Specifications on Optimum Tooth Surface Modification Amount>

Figure 35:
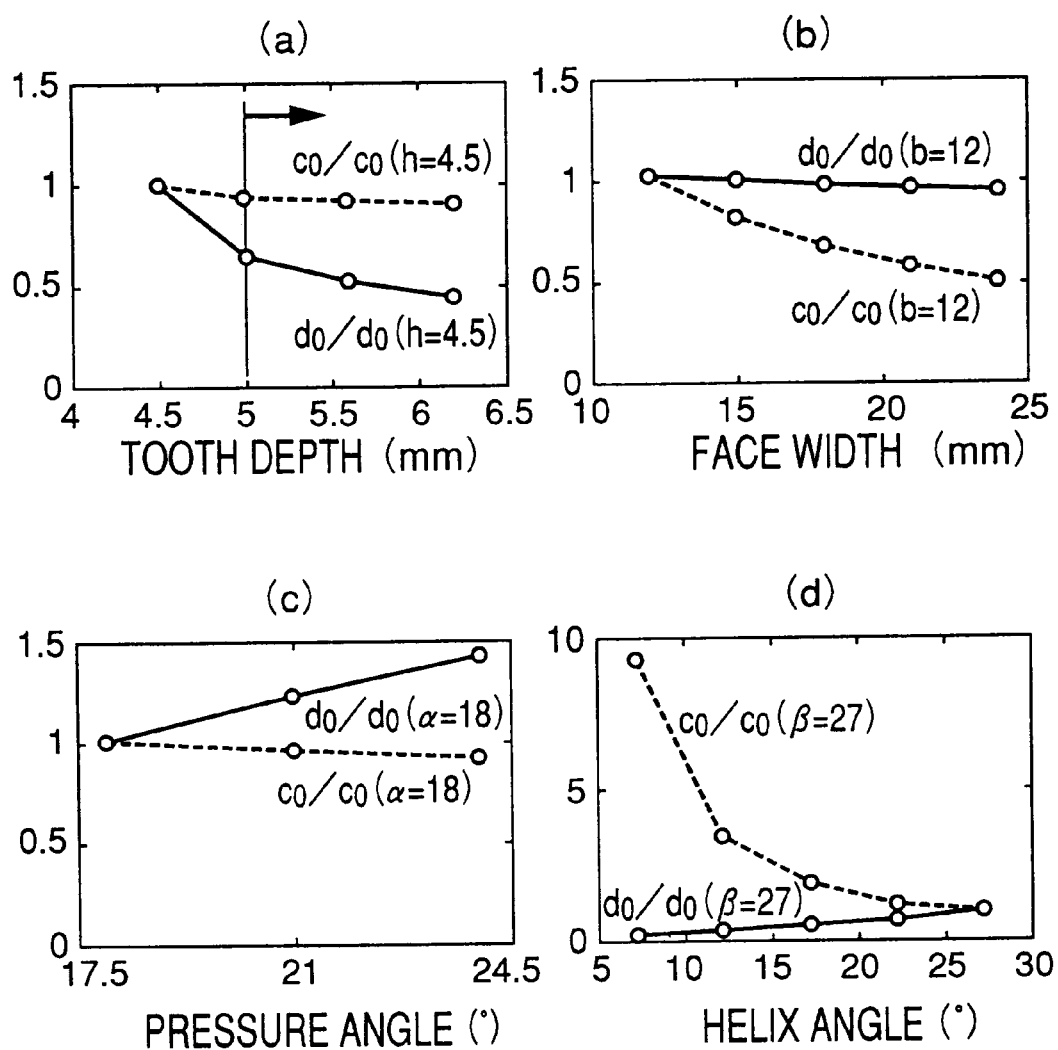
FIGS. 35 are views indicating standardized tooth profile modification and crowning coefficients $d_0$, $c_0$, where the tooth surface modification is optimized so as to accommodate the same amounts of parallelism error and torsion error, with respect to different gears which have the same number of teeth and normal module, but different values of the tooth depth h, face width b, pressure angle α and helix angle β.
Figure 36:
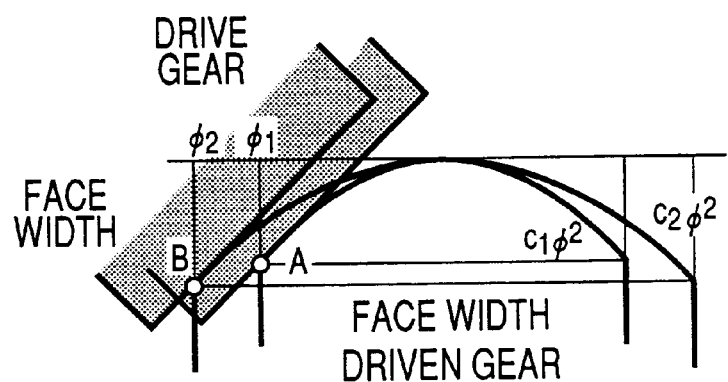
FIG. 36 is a view indicating a relationship between amounts of crowning and face width required to prevent edge contact of gear teeth.

The gear specifications must be determined so as to reduce the optimum tooth surface modification amount, by considering the relationships between the optimum tooth surface modification amount and the tooth depth h, face width b, pressure angle α and helix angle β. FIGS. 35 standardized tooth profile modification and crowning coefficients $d_0$, $c_0$, where the tooth surface modification is optimized so as to accommodate the same amounts of parallelism error and torsion error, with respect to different gears which have the same number of teeth and normal module, but different values of the tooth depth h, face width b, pressure angle α and helix angle β. The amounts of curvature and crowning of the tooth surface decrease with a decrease in the coefficients, and the transmission error amplitude decreases with the decrease in the coefficients. It will be understood that the optimum tooth profile modification amount is reduced when the tooth depth h is 5 mm or larger. In this case, the tooth width is about 2.5 times the gear module, or larger. Accordingly, it is advantageous that the tooth depth h is larger than a standard value. The optimum crowning amount decreases with an increase in the face width b. The relationship between the tooth depth h and face width b and the tooth profile modification and crowning amounts required t,: prevent the edge contact can be explained by reference to a tooth lead modification model shown in FIG. 36. since angles of inclination at contact points A and B are equal to each other, an angle of inclination of the parabola satisfies the following formula (30), which is converted into the following formula (31) representative of a coefficient $c_2$. Since $\phi_1$ is smaller than $\phi_2$, $c_2$ is smaller than $c_1$. Thus, the crowning coefficient decreases with an increase in the face width b.

$$2c_1\Phi_1=2c_2\Phi_2 \qquad (30)$$

$$c_2=c_1(\Phi_1/\Phi_2) \qquad (31)$$

Figure 37:
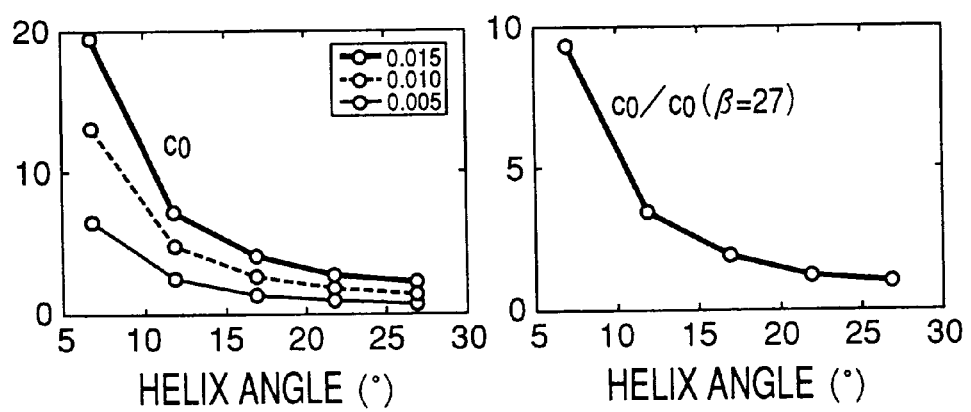
FIG. 37 is a view indicating crowning coefficients $c_0$ for different amounts of misalignment of a gear pair, and a crowning coefficient standardized by helix angle β of 27°.

Referring back to FIGS. 35, it will be understood that the pressure angle a primarily influences the tooth profile modification amount and that the tooth profile modification amount decreases with a decrease in the pressure angle α. The crowning coefficient decreases with an increase in the helix angle β. The crowning coefficient does not change considerably with the helix angle β exceeding about 20°. FIG. 37 shows optimum crowning coefficient values for different amounts of axial misalignment of the gear pair. The figure shows the crowning coefficients $c^0$ calculated so as to accommodate parallelism and torsional errors of 0.015rad, 0.01rad and 0.005rad, and the coefficient $c_0$ standardized by the helix angle β of 27°. It will be understood that the helix angle tends to have similar influences on the crowning coefficient, irrespective of the different misalignment amounts. Thus, the gear specifications that reduce the tooth surfaces modification amount have been clarified. It was found that those gear specifications coincide with the conventional gear specifications that increase the geometrical contact ratio $\epsilon_r$.

While the tooth profile and crowning modification coefficients have been explained in a comparative manner, there will be considered combinations of the gear specifications in terms of the transmission error amplitude under the non-load condition The amplitude of the transmission error of a gear pair under the non-load condition in the absence of axial misalignment of the gear pair is represented by the following formula (32), and the entire amplitude (p–p) of the transmission error waveform is represented by the following formula (33). One of the combinations of the gear specifications which gives the smallest amplitude of the transmission error is selected as the optimum combination.

$$\Delta E(\theta) = \alpha_2 \theta^2 \quad (32)$$

$$T.E. = \left[\Delta E(0) - \Delta E\left(\frac{\theta_p}{2}\right)\right] / r_{bO} \quad (33)$$

$$= -\alpha_2 \left(\frac{\theta_p}{2}\right)^2 / r_{bO} \quad (\text{rad})$$

wherein $$\alpha_2 = -\frac{A_{TH}^2 (4d_0 - b_0^2)}{4(d_0 A_{FI}^2 + b_0 A_{FI} + c_0)}$$

<Influence of Angular Pitch>

Figure 38:
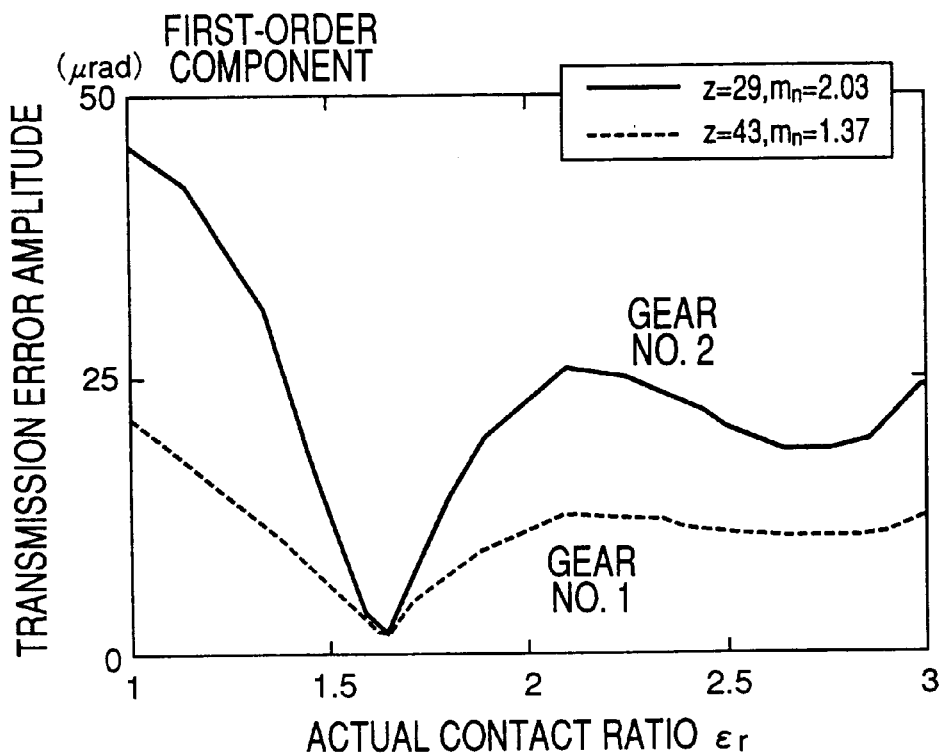
FIG. 38 is a view indicating transmission errors of gears having different angular pitches.
Figure 39:
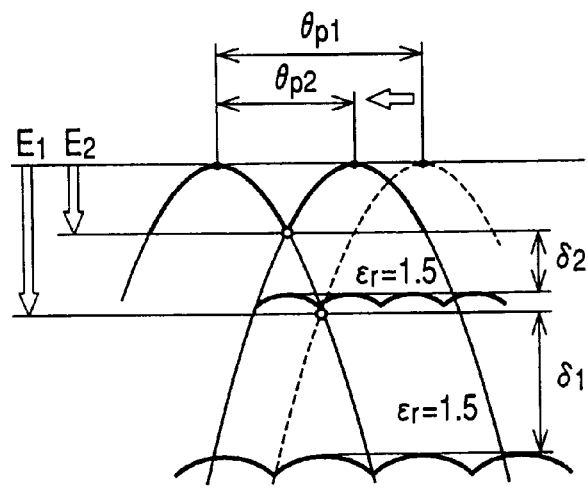
FIG. 39 is a view indicating a relationship between angular pitch and transmission error amplitude.

The transmission error amplitude is influenced by the angular pitch as well as the tooth surface modification amount. FIG. 38 shows the transmission errors of gears Nos. 1 and 2 in Table 4, which have different angular pitches. The gear No. 1 has the same pitch diameter as the gear No. 1, but has a reduced module (normal module $m_n$) and accordingly reduced tooth number (z) and angular pitch. It will be understood that the gear having the comparatively small angular pitch has a generally small transmission error amplitude. This is because the decrease in the angular pitch results in a decrease in a distance to intersection points of the transmission error waveforms, from E1 to E2, as illustrated in FIG. 39. Accordingly, the maximal values of the transmission error in the load range is reduced, and the transmission error amplitude is reduced over the entire load range. Thus, decreasing the angular pitch is effective to reduce the transmission error amplitude, so that it is desirable to minimize the module of the gear so as to maximize the number of the teeth, to an extent possible to assure the desired strength of the gear. In the case of the actual contact ratio $\epsilon_r$ of 1.5, the amount of deflection is reduced from $\delta_1$ to $\delta_2$, as exemplified in FIG. 39. Thus, the actual contact ratio $\epsilon_r$ of the gear having the relatively small angular pitch increases with a decrease in the load.

<Novel Method of Designing a Gear>

Figure 40:
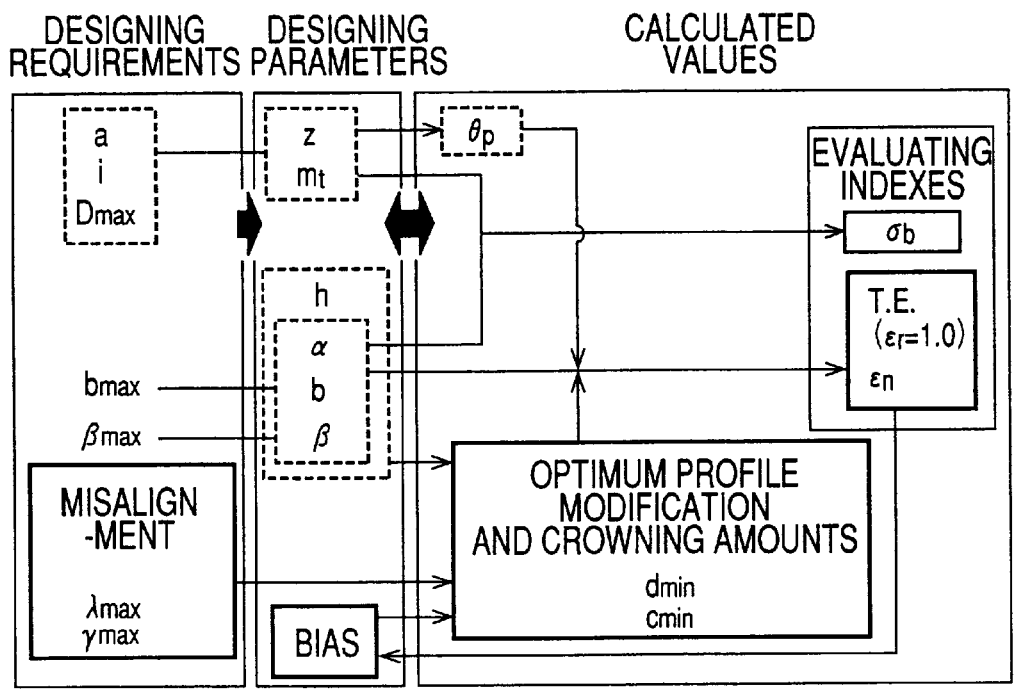
FIG. 40 is a view for explaining a novel method of designing a gear.

There will be shown a novel method of designing a gear, wherein the tooth surface modification amount is determined in the process of designing the specifications of the gear, by implementing a step of calculating the optimum amount of the tooth surface modification, and a step of calculating the transmission error amplitude and the effective contact ratio $\epsilon_n$. FIG. 40 shows a relationship among designing requirements, designing parameters, calculated values and evaluating indexes. The designing requirements include a maximum amount $\lambda_{max}$ of the parallelism error and a maximum amount $\gamma_{max}$ of the torsional error, as well as a speed reduction ratio i of the speed reducing gear device, and a center distance a, a maximum outside diameter $D_{max}$, a maximum face width $b_{max}$ and a maximum helix angle $\beta_{max}$ of the gear. The maximum helix angle $\beta_{max}$ is determined by the permissible largest load of gear shaft bearings. The designing parameters include the tooth number z, normal module $m_n$, tooth depth h, pressure angle α, face width b and helix angle β. Based on the maximum amounts $\gamma_{max}$ and $\lambda_{max}$ of the parallelism and torsional errors, as well as the selected designing parameters, optimum tooth profile modification and crowning amounts $d_{min}$ and $c_{min}$ are calculated. Based on the calculated optimum tooth surface modification amounts, a non-load transmission error amplitude T.E. and the effective contact ratio $\epsilon_n$ are calculated as designing indexes. These designing indexes and stress indexes are used to determine an optimum combination of specifications of the gear. Where the effective contact ratio $\epsilon_n$ is low, a suitable bias modification of the tooth surface may be effected in place of changing some of the gear specifications. The optimum tooth profile modification and crowing amounts, transmission error amplitude and effective contact ratio may be obtained based on the appropriate index values and according to appropriate formulas, so as to determine the optimum gear specifications and tooth surface modification.

In the conventional gear designing method which requires determinations of the gear specifications and the tooth surface modification independently of each other, it is necessary to calculate and compare the transmission errors for a large number of combination of the gear specifications and a large number of the tooth surface modification amounts. Since adequate method of determination of the tooth surface modification is not conventionally available, the conventional method requires a considerable time to determine the optimum gear specifications and tooth surface modification. In the present novel designing method, the tooth surface modification can be determined together with the gear specifications, making it possible to not only improve the quality of the gear but also significantly reduce the require designing time.

Figure 41:
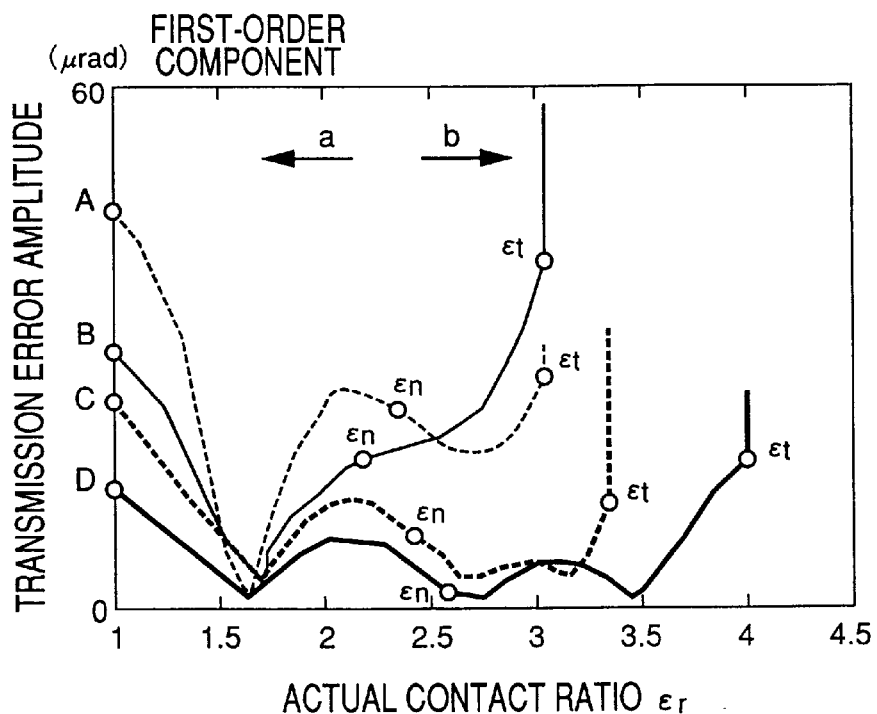
FIG. 41 is a view indicating examples of transmission error of different gears designed according to the method of FIG. 40.

FIG. 41 shows the transmission errors of different gears designed according to the present novel method. In the figure, "A" indicates a waveform of the transmission error of the gear No. 2 in Table 4, which has a tooth profile modification amount of 10μm and a crowning amount of 10μm. "B" indicates a waveform wherein the tooth surface modification of the gear is optimized so as to accommodate a parallelism error of 0.01rad and a torsional error of 0.01rad. In this case, the transmission error amplitude can be reduced when the load is relatively low. However, the transmission error amplitude is relatively large in a high-load range indicated at b, in which the actual contact ratio $\epsilon_r$ exceeds the effective contact ratio $\epsilon_n$. "C" indicates a waveform of the gear whose tooth depth is increased from 5.6mm to 6.2 and whose pressure angle is reduced from 18° to 16°, whereby the tooth surface modification is optimized. In this case C, the transmission error is reduced as a result of decreases in the tooth profile modification and crowning amounts owing to the optimization In addition, the transmission error is small even in the high-load range b in which the effective contact ratio $\epsilon_n$ is higher than 2.4. "D" indicates a waveform of the gear whose tooth number is increased to optimize the tooth surface modification. In this case D, the transmission error is small over the entire load range. It is noted that although the transmission error amplitude is relatively large in the high-load range in which the actual contact ratio $\epsilon_r$ is close to the geometrical contact ratio $\epsilon_t$, this relatively large transmission error amplitude does not matter in general, in view of a fact that a gear is likely to have a large noise in the low-load range.

<Influence of Tooth Surface Variation due to Manufacture>

There has been a study on a relationship between the non-load transmission error and the tooth surface error variation The waveform of the transmission error changes due to a tooth surface variation, and includes a component including a sideband wave, other than the first-order and second-order components. However, the first-order component of the transmission error amplitude during normal meshing of the tooth pair without an edge contact does not exceed an average value of all the teeth which is calculated with the tooth surface variation taken into account. This is true under the non-load condition, and where the transmission error amplitude has maximal values with the actual contact ratio $\epsilon_r$ being equal to an integer. According to the gear designing method of the present inventors, the gear is designed using an average value of the transmission error amplitudes of all of the gear teeth, with a particular attention given to the maximal values of the transmission error amplitude which appear when the actual contact ratio $\epsilon_r$ is equal or close to any integers, particularly, to the maximal value of the amplitude under the non-load condition <Conclusion>

The present novel method of designing a gear includes the calculations of the optimum tooth surface modification amount, transmission error amplitude and effective contact ratio $\epsilon_n$, in addition to the conventionally implemented steps, so that the tooth surface modification amount is determined in the process of determination of the gear specifications. This novel method permits the determination of the modified tooth surface concurrently with the determination of the gear specifications, making it possible to not only improve the quality of the gear designed, but also significantly the reduce the required designing time. Further, the present invention provides the following indexes used for designing a gear:

(i) The transmission error amplitude is considerably large over the entire load range, during the edge contact due to axial misalignment of a gear pair.

(ii) The optimum tooth surface modification can be obtained by determining the tooth profile and crowning amounts so as to prevent an edge contact even in the presence of an upper limit of the axial misalignment of a gear pair.

(iii) The optimum tooth surface modification amount and the transmission error amplitude can be reduced, by increasing the tooth depth, face width and helix angle of the gear and by reducing the pressure angle of the gear.

(iv) The transmission error amplitude can be effectively reduced by providing the gear with a tooth depth which is at least 2.5 times the normal module, and a helix angle of at least 20°.

(v) The transmission error amplitude can be effectively reduced over the entire load range, by minimizing the module of the gear to an extent possible to assure the desired strength of the gear, and by increasing the number of teeth to reduce the angular pitch.

While the present invention has been described in detail by reference to the drawings, it is to be understood that the present invention may be otherwise embodied.

For instance, the present invention which has been described with respect to a helical gear is applicable to other gears such as a spur gear whose teeth extend in parallel with a gear shaft.

While the crowning and convex profile of the teeth have been defined by parabolic lines, they may be defined by simple circular arcs, to determine the tooth surface modification.

It is possible to evaluate a gear for its noise, without performing tests, by calculating the transmission error amplitude of a gear based on the actually measured dimensions and geometry of the gear and analyzing the calculated transmission error amplitude in relation to the actual contact ratio $\epsilon_r$. Further, it is possible to evaluate a gear for its noise, without performing tests, by calculating the effective contact ratio $\epsilon_n$ based on the actually measured dimensions and geometry of the gear.

While the actual contact ratio $\epsilon_r$ has been defined above using the angular range $\theta_r$ and angular pitch $\theta_p$, substantially the same result may be obtained in defining the actual contact ratio, by using the length dimension on the pitch circle or other parameters without departing from the spirit of the present invention.

While the effective contact ratio $\epsilon_n$ has been defined above using the angular range $\theta_r$ and angular pitch $\theta_p$, substantially the same result may be obtained in defining the effective contact ratio, by using the length dimension on the pitch circle or other parameters without departing from the spirit of the present invention.

It is to be understood that the present invention may be embodied with various other changes and improvements, which may occur to those skilled in the art.

As described above, the present invention can be suitably practiced for efficient and easy designing or manufacture of a gear with a reduced noise, and in various other fields of technology using gears.

What is claimed is:

1. A method of designing a gear, wherein at least one of specifications and a tooth surface modification of said gear is determined based on an actual contact ratio of said gear, said actual ratio varying with a load acting on said gear.

2. A method as set forth in claim 1, wherein said actual contact ratio is a value $\theta_r/\theta_p$, wherein $\theta_r$ represents an angular range in which a pair of teeth actually contact each other, while $\theta_p$ represents an angular pitch of said gear.

3. A method of designing a gear, wherein at least one of specifications and a tooth surface modification of said gear is determined based on an actual contact ratio of said gear, said actual contact ratio load acting on said gear and being equal to a value $\theta_r/\theta_p$, wherein $\theta_r$ represents an angular range in which a pair of teeth actually contact each other, while $\theta_p$ represents an angular pitch of said gear, said at least one of said specifications and said tooth surface modification being determined so as to reduce an amplitude of a transmission error of said pair of teeth under a non-load condition in which said actual contact ratio $\theta_r/\theta_p$ is equal to 1.0.

4. A method of designing a gear, wherein at least one of specifications and a tooth surface modification of said gear is determined based on an effective contact ratio of said gear, said effective contact ratio being equal to a value $\theta_n/\theta_p$, wherein $\theta_n$ represents an angular range corresponding to a portion of a path of a contact point of a pair of teeth in which said pair of teeth does not have an edge contact on a tooth top thereof or at an end of a face width thereof, while $\theta_p$ represents an angular pitch of said gear, said path of said contact point being determined based on said specifications and said tooth surface modification of said gear.

5. A method as set forth in claim 4, wherein said at least one of said specifications and said tooth surface modification is determined so as to increase said effective contact ratio.

6. A method as set forth in claim 5, wherein said tooth surface modification is biased in a bias-in direction to increase said effective contact ratio.

7. A method as set forth in claim 4, wherein said at least one of said specifications and said tooth surface modification is determined such that said effective contact ratio $\theta_n/\theta_p$ is at least about 2.4.

8. A method as set forth in claim 5, wherein said effective contact ratio is increased by determining said specifications so as to increase a geometrical contact ratio of said gear, and providing a tooth surface of said gear with a biased modification.

9. A method as set forth in claim 5, wherein said at least one of said specifications and said tooth surface modification is determined so as to reduce an amplitude of a transmission error of said pair of teeth under a non-load condition and to increase said effective contact ratio.

10. A method of manufacturing a gear, wherein at least one of specifications and a tooth surface modification of said gear is determined according to a method as set forth in claim 1, and said gear is manufactured such that said gear has said at least one of said specifications and said tooth surface modification which has been determined according to said method.

11. A gear wherein manufactured according to a method as set forth in claim 10.

12. A method of manufacturing a gear, wherein at least one of specifications and a tooth surface modification is determined according to a method as set forth in claim 4, and said gear is manufactured such that said gear has said at least one of said specifications and said tooth surface modification which has been determined according to said method.

13. A gear manufactured according to a method as set forth in claim 12.

14. A method according to claim 4, wherein said gear is a helical gear.

* * * * *